United States Patent
Rhyne et al.

(10) Patent No.: US 7,206,482 B2
(45) Date of Patent: Apr. 17, 2007

(54) PROTECTIVE CASINGS FOR OPTICAL FIBERS

(75) Inventors: Todd R. Rhyne, Hickory, NC (US); David A. Seddon, Hickory, NC (US); James D. Mohler, Granite Falls, NC (US); Joseph T. Cody, Hickory, NC (US); William C. Hurley, Hickory, NC (US)

(73) Assignee: Corning Cable Systems, LLC., Hickory, NC (US)

( * ) Notice: Subject to any disclaimer, the term of this patent is extended or adjusted under 35 U.S.C. 154(b) by 7 days.

(21) Appl. No.: 11/099,864

(22) Filed: Apr. 6, 2005

(65) Prior Publication Data

US 2005/0213900 A1    Sep. 29, 2005

Related U.S. Application Data

(63) Continuation-in-part of application No. 10/809,619, filed on Mar. 25, 2004, now Pat. No. 7,035,513.

(51) Int. Cl.
G02B 6/44   (2006.01)
G02N 21/00  (2006.01)

(52) U.S. Cl. ............ 385/113; 385/103; 385/100; 386/73.1

(58) Field of Classification Search ........ 385/100–114; 356/73.1
See application file for complete search history.

(56) References Cited

U.S. PATENT DOCUMENTS

| | | | |
|---|---|---|---|
| 4,467,138 A | 8/1984 | Brorein | 174/115 |
| 4,729,628 A | 3/1988 | Kraft et al. | 350/96.23 |
| 4,761,053 A | 8/1988 | Cogelia et al. | 350/96.23 |
| 4,776,664 A | 10/1988 | Okura | 350/96.23 |
| 4,787,705 A | 11/1988 | Shinmoto et al. | 350/96.23 |
| 4,892,382 A | 1/1990 | Story et al. | 350/96.23 |
| 5,180,890 A | 1/1993 | Pendergrass et al. | 174/117 |
| 5,561,729 A | 10/1996 | Parris | 385/113 |
| 5,566,266 A | 10/1996 | Nave et al. | 285/113 |
| 5,651,081 A | 7/1997 | Blew et al. | 385/101 |
| 6,137,935 A * | 10/2000 | Bohme et al. | 385/109 |
| 6,188,821 B1 | 2/2001 | McAlpine et al. | 385/100 |
| 6,249,629 B1 | 6/2001 | Bringuier | 385/113 |

(Continued)

OTHER PUBLICATIONS

NEPTCO Fiber Optic Cable Components "Drop Wire Reinforcement LFEDW (DW830B)", Jun. 2004.

(Continued)

*Primary Examiner*—Brian Healy
*Assistant Examiner*—Charlie Peng

(57) ABSTRACT

Disclosed is a fiber optic drop cable including at least one optical waveguide, at least one roving, and a cable jacket. In one embodiment, the at least one roving includes a resin matrix having a water-based acrylic composition that includes an ethylene-acrylic acid and a water-swellable component. The resin matrix has a percent by weight of about 10 percent or less of the flexible roving so that the at least of one roving is at least partially bonded with the cable jacket, thereby inhibiting buckling of the cable jacket. In another embodiment, a plurality of rovings are arranged in clusters in the cable for influencing the bonding between the rovings and cable jacket. Also, disclosed is a protective casing for protecting and routing optical fibers along with preconnectorized cable assemblies.

24 Claims, 16 Drawing Sheets

U.S. PATENT DOCUMENTS

| | | | |
|---|---|---|---|
| 6,311,000 B1 | 10/2001 | Schneider | 385/113 |
| 6,356,690 B1 | 3/2002 | McAlpine et al. | 385/109 |
| 6,400,873 B1 | 6/2002 | Gimblet et al. | 385/102 |
| 6,487,345 B1 | 11/2002 | Dixon et al. | 385/100 |
| 6,487,347 B2 | 11/2002 | Bringuier | 385/113 |
| 6,501,888 B2 | 12/2002 | Gimblet et al. | 385/113 |
| 6,529,663 B1 | 3/2003 | Parris et al. | 385/113 |
| 6,542,674 B1 | 4/2003 | Gimblet | 385/113 |
| 6,546,175 B1 | 4/2003 | Wagman et al. | 385/113 |
| 6,563,990 B1 | 5/2003 | Hurley et al. | 385/101 |
| 6,567,592 B1 | 5/2003 | Gimblet et al. | 385/113 |
| 6,897,382 B2 * | 5/2005 | Hager et al. | 174/116 |

OTHER PUBLICATIONS

NEPTCO Incorporated "Fiber Optic Cable Components", Apr. 2003.
Perelli, "ResiLink LT™ Drop Cables", Jul. 2002.
Perelli, "ResiLink™ Drop Cable", Jan. 2002.
Sumitomo Cable Specifications "Self-Supporting Figure-8 Sheath Optical Fiber Service Drop Cable with Stranded Steel Messenger", Nov. 2003.
U.S. Appl. No. US 2004/0050584, Mar. 18, 2004.

* cited by examiner

PROTECTIVE CASINGS FOR OPTICAL FIBERS

RELATED APPLICATIONS

The present application is a Continuation-In-Part (CIP) of U.S. Ser. No. 10/809,619 filed on Mar. 25, 2004 now U.S. Pat. No. 7,035,513, the disclosure of which is incorporated herein by reference in its entirety. The present application is also related to U.S. patent application Ser. No. 11/099,705 respectively titled "Fiber Optic Drop Cables Suitable for Outdoor Fiber to the Subscriber Applications" and filed on even date herewith.

FIELD OF THE INVENTION

The present invention relates generally to protecting optical fibers. More specifically, the invention relates to protective casings suitable for routing an optical fiber therein.

BACKGROUND OF THE INVENTION

Communication networks are used to transport a variety of signals such as voice, video, data transmission, and the like. Traditional communication networks use copper wires in cables for transporting information and data. However, copper cables have drawbacks because they are large, heavy, and can only transmit a relatively limited amount of data. Consequently, optical waveguide cables replaced most of the copper cables in long-haul communication network links, thereby providing greater bandwidth capacity for long-haul links. However, most communication networks use copper cables for distribution and/or drop links on the subscriber side of the central office. In other words, subscribers have a limited amount of available bandwidth due to the constraints of copper cables in the communication network. Stated another way, the copper cables are a bottleneck that inhibit the subscriber from utilizing the relatively high-bandwidth capacity of the long-hauls links.

As optical waveguides are deployed deeper into communication networks, subscribers will have access to increased bandwidth. But there are certain obstacles that make it challenging and/or expensive to route optical waveguides/optical cables deeper into the communication network, i.e., closer to the subscriber. Long-haul applications used fiber optic cable designs typically having relatively large diameters that were robust and thus very stiff for protecting and preserving optical performance in the outdoor environment. These designs worked well for the long-haul application but are not suitable for subscriber applications. Laying the last mile of optical fiber to the subscriber requires a low-cost fiber optic cable that is craft-friendly for installation and connectorization, flexible for slack storage, has a small cross-section, performs well in a cable clamp, and that is versatile. Moreover, the reliability and robustness of the fiber optic cable or protective casings for subscriber applications must withstand the rigors of the outdoor environment such as ice and wind loading without experiencing elevated levels of optical attenuation.

FIG. 1 schematically illustrates two different methods for routing fiber optic cables to a premises 19. Specifically, FIG. 1 shows a first method of routing a fiber optic cable 10 to premises 19 in an aerial application and a second method using a cable 10' routed to premises 19 in a buried application. In a typical aerial application, cable 10 has a first end 10a that is attached at a first interface device 12 located on pole 11 and a second end 10b that is routed to an interface device 14 at premises 19. In aerial applications, fiber optic cable 10 is attached to the pole and/or house using a clamp device such as a P-clamp holds the cable and allows tensioning of the same. In buried applications, the first and second ends of cable 10' are respectively routed to pedestal 18 and connected to interface device 16 and routed and connected to interface device 14.

Fiber optic cables have used rigid strength members made of materials such as steel or glass reinforced plactics (grp) that provide tensile strength, allow for clamping, and aid in inhibiting buckling and shrinkage of the cable providing good performance. However, these rigid strength members make the fiber optic cable relatively stiff, thereby inhibiting characteristics such as slack storage and craft-friendliness. In other words, the rigid strength members increase the bending radius of the cable when coiled, and the strength members act like a coiled spring that wants to unwind. Fiber optic cables also have used strength members such as conventional fiberglass yarns or aramid fibers, these strength members provide tensile strength and result in a flexible cable, but generally speaking do not provide anti-buckling strength for the cable. Additionally, conventional fiberglass yarns or aramid fibers do not provide enough coupling to the cable for adequate clamping performance. By way of example, aramid fiber strength members are able to migrate within the clamp relative to the jacket so that forces can be transferred to the optical fibers causing high levels of optical attenuation and in extreme cases can cause the optical fiber to be pulled-out from the optical connector. Consequently, cable designs using conventional fiberglass yarns or strength members are not suitable for the rigors of outdoor drop cable applications since the temperature variations and/or clamping arrangements cause elevated levels of attenuation or cable failure, which are unacceptable. Thus, the prior art cables do not meet all of the requirements for a drop cable that is suitable for routing optical waveguides to the subscriber.

DETAILED DESCRIPTION OF THE INVENTION

The present invention will now be described more fully hereinafter with reference to the accompanying drawings showing preferred embodiments of the invention. The invention may, however, be embodied in many different forms and should not be construed as limited to the embodiments set forth herein; rather, these embodiments are provided so that the disclosure will fully convey the scope of the invention to those skilled in the art. The drawings are not necessarily drawn to scale but are configured to clearly illustrate the invention.

Figure 1:
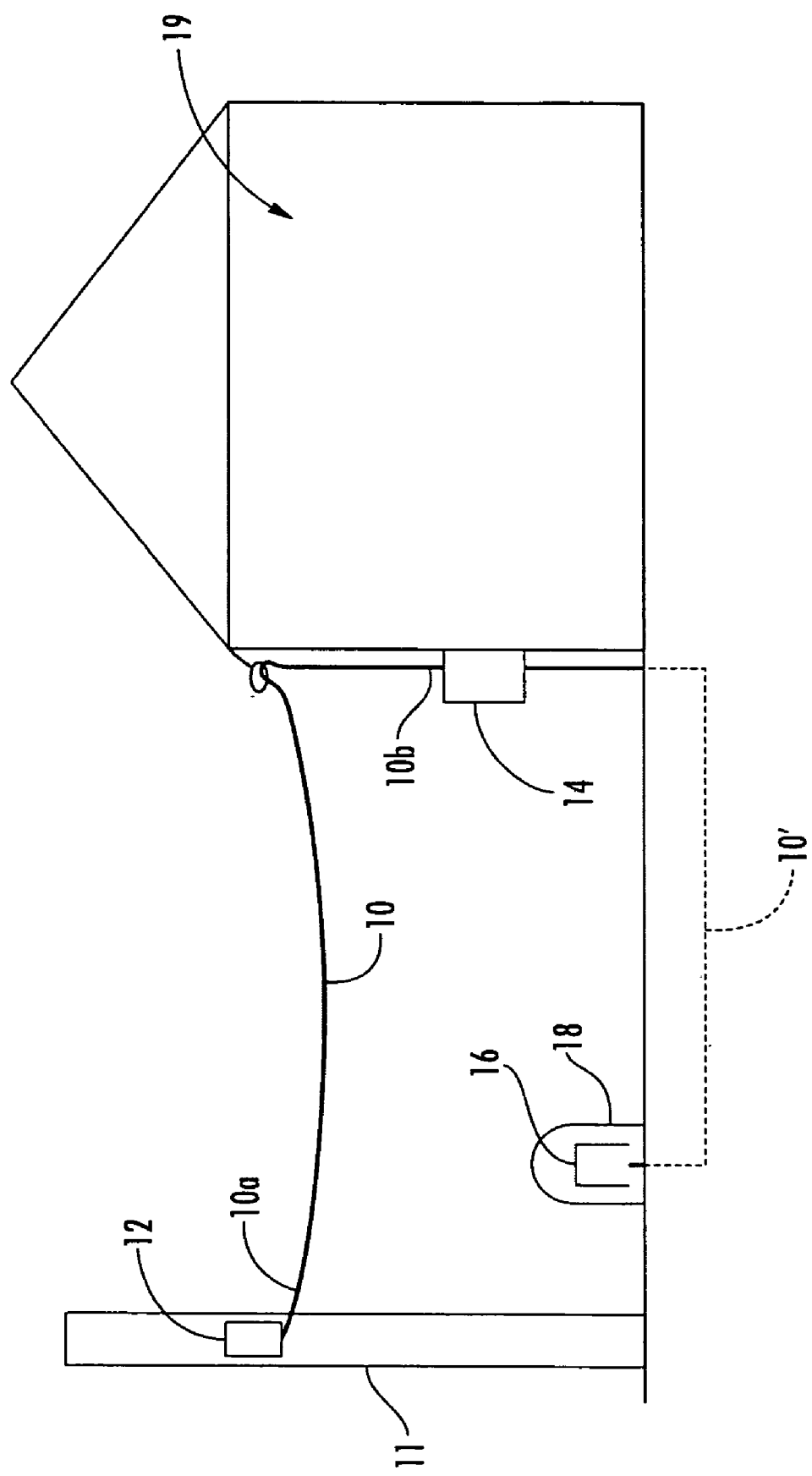
FIG. 1 schematically illustrates two methods for routing a fiber optic drop cable to a premises.
Figure 2:
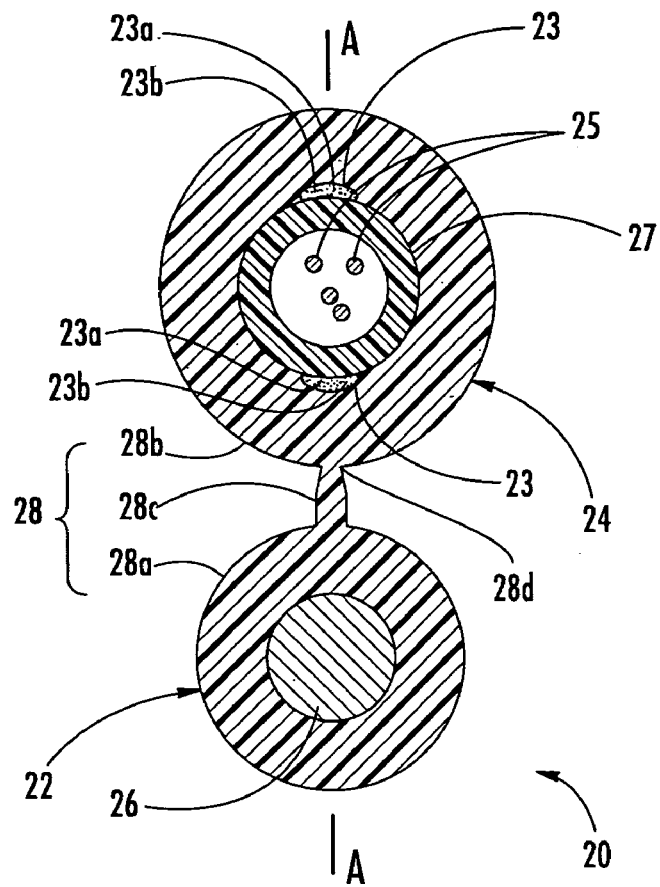
FIG. 2 is a cross-sectional view of a figure-eight fiber optic drop cable according to the present invention.
Figure 3:
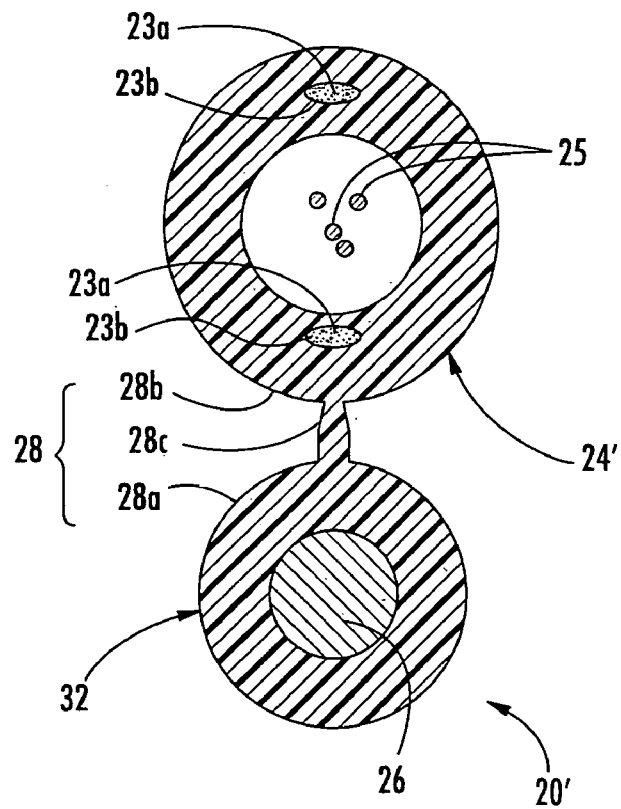
FIG. 3 is a cross-sectional view of another figure-eight fiber optic cable according to the present invention.

Illustrated in FIG. 2 is an exemplary fiber optic drop cable 20 (hereinafter cable 20) according to one embodiment of the present invention. Cable 20 is a figure-eight design that includes a messenger section 22 and a carrier section 24 having at least one roving 23 and at least one optical waveguide 25 such as an optical fiber therein. As depicted, optical waveguides 25 are loose, but they may have other configurations. Messenger section 22 has a messenger jacket 28a and carrier section 24 has a carrier jacket 28b connected by a web 28c. Web 28c also includes a preferential tear portion 28d to aid in separation of carrier and messenger sections 22,24. Messenger section 22 also includes a strength component 26 for carrying tensile loads applied to cable 20. Strength component 26 is shown as a steel rod, but it may be a stranded wire. Additionally, cables of the present invention can include a strength component as disclosed in U.S. patent application Ser. No. 10/623,231 filed on Jul. 18, 2003 titled "Fiber Optic Cable having a Strength Member", the disclosure of which is incorporated herein by reference. Likewise, other suitable materials such as dielectrics or other conductive materials are possible for strength component 26. In this embodiment, carrier section 24 also includes a tube 27 for housing at least one optical waveguide 25. FIG. 3 shows a similar cable 20', which is a tubeless configuration, i.e., optical fibers are still housed within the jacket but tube 27 is eliminated. Additionally, rovings 23 of cable 20' are embedded within carrier jacket 28b rather than being positioned against the tube, which may further improve performance characteristics of the cable. Cables of the present invention may also include other suitable components such as a plurality of ripcords (not shown), thereby allowing the craftsman to easily open the jacket to access the optical fibers. Likewise, cables 20 and 20' may include a thixotropic material for water-blocking or they can alternatively have a dry construction. Other suitable components for use in cables of the present invention include tapes and yarns having a water-swellable or flame-retardant characteristics, armor, binder threads for fiber bundles or securing tapes, or any other suitable cable component.

As depicted in FIG. 2, cable 20 includes two rovings 23 generally aligned on a plane A—A that generally passes through strength component 26 and web 28c. In other words, rovings 23 are disposed at six o'clock and twelve o'clock positions, thereby imparting a preferential bend characteristic to cable 20. But, of course, other suitable positions for rovings 23 and/or other suitable numbers of rovings 23 are possible using the concepts of the present invention. For instance, cables according to the present invention can have more than two rovings 23; however, cables requiring fewer rovings may reduce material costs for the cable. Providing a reliable low-cost cable is advantageous since drop cables will generally have relatively low optical waveguide counts and require large length quantities to provide access for many subscribers. Moreover, providing access for many subscribers is labor intensive, thereby making the access procedure relatively expensive. Thus, cable costs should be relatively low for drop cables, while reducing the time required for the craft to access optical fibers within the drop cable.

Cables according to the present invention provide a low-cost drop cable having enhanced performance characteristics for preserving optical performance in outdoor applications such as fiber to the subscriber. Moreover, cables according to the present invention accomplish superior performance levels because unlike conventional cables they provide improved anti-buckling performance in a flexible design, thereby resulting in a robust design that is craft-friendly. For instance, when carrier section 24 is separated from messenger section 22 in cable 20, the carrier section 24 generally has a lower average shrinkage and a lower average coefficient of thermal expansion (CTE) compared with conventional cables.

Consequently, in figure-eight cable designs carrier section 24 can be separated from messenger section 22 while maintaining a maximum delta attenuation of optical waveguides 25 at about 0.3 dB/20 meters or less, more preferably about 0.1 dB/20 meters or less during temperature cycling at a reference wavelength of 1550 nm at a temperature of about −40° C. after heat aging at 70° C. On the other hand, conventional figure-eight cables have elevated levels of shrinkage and/or CTE when the carrier and messenger section are separated, thereby causing elevated levels of optical attenuation. Thus, conventional figure-eight cables are generally inoperable for aerial or buried applications where the carrier and messenger sections are separated. In other words, the optical attenuation of the optical fibers exceeds permissible levels. Moreover, cables according to the present invention are craft-friendly for connectorization and slack storage making them highly desirable for fiber to the subscriber applications.

Cables of the present invention have at least one roving 23 that comprises a plurality of glass fibers 23a having a resin matrix 23b thereon. Rovings 23 at least partially bond with the cable jacket during extrusion thereof and provide anti-buckling resistance while still allowing desirable drop cable characteristics such as flexibility for looping the cable in relatively small diameters for slack storage. In preferred embodiments, glass fibers 23a are an e-glass, but other suitable types of glass fibers can be used for roving 23. Glass fibers 23a have individual filament diameters in the range of about 10 microns to about 20 microns, but any suitable diameter is possible. Preferably, the individual glass fiber diameter is sized so such that they do not irritate the craftsman during handling of the same. Glass fibers 23a are about 90% or more by weight and resin matrix 23b is about 10% or less by weight of rovings 23. In preferred embodiments, glass fibers 23a comprise about 93% or more by weight, and more preferably about 95%, and resin matrix 23b is about 7% or less by weight, more preferably about 5%. Resin matrix 23b comprises a water-based acrylic composition that includes an ethylene-acrylic acid. Suitable rovings 23 are available from NEPTCO, Incorporated of Pawtucket, R.I. under the RPLPE tradename. In other embodiments, rovings 23 can include a water-swellable substance thereon and/or therein for inhibiting the migration of water along the cable, particularly along the rovings. Likewise, rovings 23 can have other suitable configurations for at least partially bonding with the cable jacket formed from polyethylene or any other suitable material. By way of example, if a cable jacket material was formed from a PVC, Nylon, PVDF, or the like the roving may have another suitable resin matrix 23b. For instance, using a PVC cable jacket a suitable roving 23 is available from NEPTCO, Incorporated under the LFEDW tradename.

Several different experiments were conducted to investigate the performance of figure-eight cables according to the present invention compared with conventional figure-eight cables having a similar construction. The cables of the present invention and the conventional cables had similar constructions and processing parameters expect where noted otherwise. Specifically, the cables of the experiments included either four or twelve SMF-28e single-mode optical fibers commercially available from Corning, Incorporated in a polybutylene terephtalate (PBT) buffer tube having a 2.85 mm OD and a 2.05 mm ID. The cables were manufactured with an excess fiber length of about 0.0%. The tested figure-eight cables differed in that the conventional cables included either two or four fiberglass strands available from Owens-Corning, Incorporated under the tradename CR-785. On the other hand, the tested cables of the present invention included rovings 23 which were from NEPTCO Incorporated under the tradename RPLPE 675. The strength components of the messenger sections were a solid steel rod. Additionally, the jackets of all of the cables were formed from the same medium-density polyethylene (MDPE).

Figure 4:
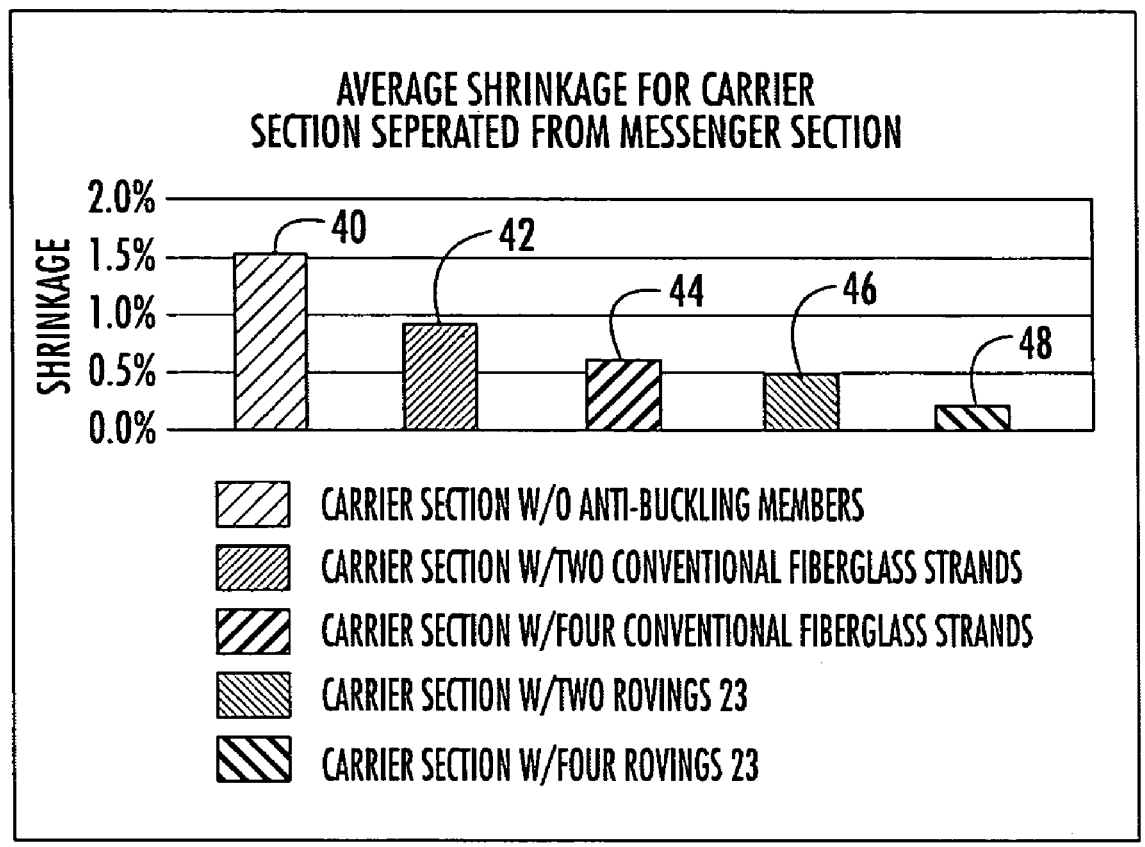
FIG. 4 is a bar graph depicting an average shrinkage during an average shrinkage test for a carrier section of the figure-eight fiber optic cable in FIG. 2 after being separated from the messenger section along with a variation of the cable in FIG. 2 and the average shrinkage for similar separated carrier sections of conventional figure-eight fiber optic drop cables.

FIG. 4 is a bar graph depicting an average shrinkage during an average shrinkage test for five different carrier sections that were separated from the messenger section of respective figure-eight drop cables. The average shrinkage test measured the average shrinkage by taking a 1 meter sample of the respective carrier sections that were separated from the messenger section of the respective figure-eight cables. Thereafter, the respective 1 meter carrier sections were placed in a thermal chamber set at about 70° C. for at least thirty minutes and then removed and allowed to cool to an ambient room temperature of about 20° C. Then, the respective lengths of the carrier sections were measured and an average shrinkage was calculated as a percentage for the respective carrier samples of the respective figure-eight cables. Since the average shrinkage of the carrier section was measured, the number of optical waveguides in the carrier section is irrelevant to the average shrinkage, but the number of optical waveguides in the carrier section can affect the delta attenuation during temperature cycling.

For a baseline comparison, a carrier section of a figure-eight cable that did not include any anti-buckling members was tested and is represented by bar 40. The baseline carrier section represented by bar 40 was different from the other cables tested because it had a buffer tube with an OD of about 2.5 mm, compared with the OD of 2.85 mm for the buffer tubes of the other cables. As shown, bar 40 depicts an average shrinkage of about 1.5% for this carrier section. Optical fibers in this carrier section had extremely high maximum delta attenuation levels during temperature cycling at a reference wavelength of 1550 nm. Maximum delta attenuation during temperature cycling was on the order of 20.0 dB/20 meters and higher at about −40° C. for the construction depicted in bar 40, which had twelve optical waveguides within the tube. Consequently, the carrier section represented by bar 40 was unsuitable for separation from the messenger section because of the extremely high delta attenuation levels experienced.

Bars 42 and 44 respectively represent carrier sections of figure-eight cables having two and four conventional fiberglass strands. The embodiment depicted by bar 42 had two fiberglass strands that were disposed about 180 degrees apart. As shown, bar 42 depicts an average shrinkage of about 0.9% for the carrier section. In the embodiment depicted by bar 44, the carrier section included four fiberglass strands. The fiberglass strands were disposed about 180 degrees apart in adjacent groups of two. As shown, bar 44 depicts an average shrinkage of about 0.6% for the carrier section. Thus, including fiberglass strands decreased the average shrinkage compared with the carrier section of bar 40.

Moreover, the average shrinkage was further decreased by increasing the number of fiberglass strands from two to four; however, this may increase the material cost and manufacturing complexity for the cable. Maximum delta attenuation during temperature cycling for the configurations of bars 42 and 44 were respectively on the order of 0.6 dB/20 meters and 0.08 dB/20 meters at a reference wavelength of 1550 nm at about −40° C., with twelve optical waveguides in the carrier section. Generally speaking, higher maximum delta attenuations were observed when twelve optical waveguides were disposed within the carrier section compared with carrier sections having four optical waveguides within a similar carrier section. The conventional cable represented by bar 42 was on the design bubble since the shrinkage and maximum delta attenuation was an average value and some manufactured cables would be acceptable and others would fail, thereby reducing yield and requiring testing of each cable manufactured. The conventional cable represented by bar 44 (the conventional figure-eight cable having four fiberglass strands) had better performance for both the average shrinkage test and the maximum delta attenuation temperature cycling compared with the conventional cable of bar 42, but it increased the cost of the cable and it requires a more complex manufacturing operation. Additionally, it is possible for some of the conventional cables represented by bar 44 to fail due to, among other things, variability in the manufacturing process. Thus, these conventional cables are not reliable in drop cable applications that route optical fibers toward the subscriber.

Bars 46 and 48 respectively represent carrier sections of figure-eight cables according to the present invention having two and four rovings 23. The embodiment depicted by bar 46 had two rovings 23 disposed about 180 degrees apart. As shown, bar 46 depicts an average shrinkage of about 0.5% for the carrier section. In the embodiment depicted by bar 48, the carrier section included four fiberglass strands. The four fiberglass strands were disposed about 180 degrees apart in adjacent groups of two. As shown, bar 48 depicts an average shrinkage of about 0.2% for the carrier section. Thus, carrier sections of figure-eight cables according to the present invention decreased the average shrinkage compared with the respective embodiments of bars 42 and 44. More surprisingly, maximum delta attenuation during temperature cycling for the configurations of bars 46 and 48 were respectively on the order of 0.03 dB/20 meters and 0.01 dB/20 meters at a reference wavelength of 1550 nm at about −40° C. Thus, the figure-eight cables of the present invention yielded surprising results compared with similar conventional figure-eight cables tested.

Optical waveguides 25 of the present invention preferably have an excess fiber length (EFL) that is about 0%. However, there are practical limits on the amount of EFL that can be used in a buffer tube or cavity of a tubeless cable. Generally speaking, all things being equal, the larger the inner diameter (ID) the more space that is available for EFL. However, placing more optical waveguides in the tube or cavity decreases the available space for EFL and can affect optical performance. Fiber optic cables of the present invention preferably have an EFL in the range of about 0.9% to about −0.03% in a tube or cavity. By way of example, a tube or cavity of a cable according to the present invention has an ID of about 4 mm or less, more preferably about 2 mm, with 12 or fewer fibers and an EFL of about 0.1% or less. But, of course other suitable EFLs, IDs, or numbers of fibers are possible with cables of the present invention. For instance, a tube or cavity of a cable can have an ID of about 6 mm or less, more preferably about 2–3 mm, and include 24 fibers and an EFL of about 0.1% or less. Additionally, the percent difference between the average carrier section or cable shrinkage and the EFL is about 0.9% or less, more preferably about 0.5% or less, and most preferably about 0.3% or less. For instance, if an average shrinkage of the carrier section is 0.5% and the EFL is 0.1% the difference therebetween is 0.4%. Furthermore, the EFL and average shrinkage can be added as a sum that is related to a contraction window for the cable. By way of example, the EFL plus the average shrinkage is in the range of about 0% to about 0.7%, more preferably in the range of about 0% to about 0.5%, and most preferably in the range of about 0% to 0.4%.

Figure 5:
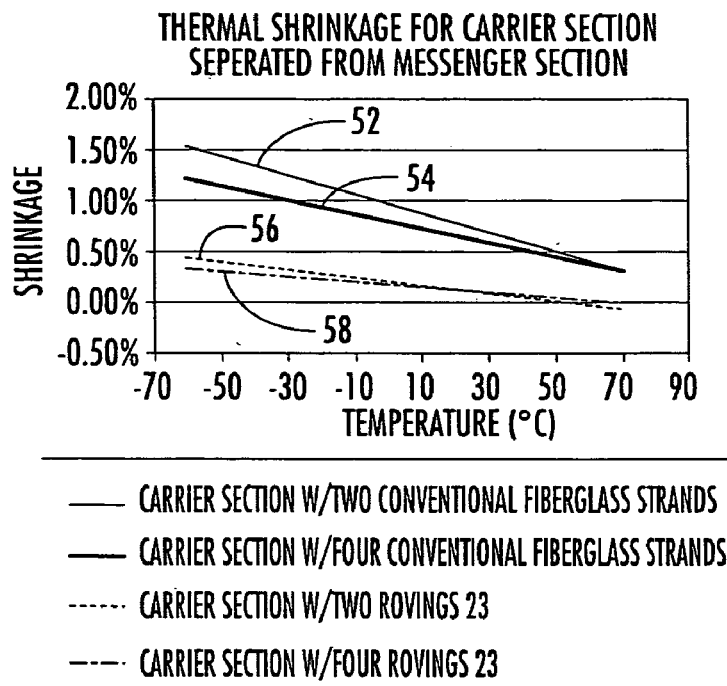
FIGS. 5 and 6 respectively are a line graph and a bar graph depicting an average coefficient of thermal expansion (CTE) for the carrier section of the cable in FIG. 2 after being separated from the messenger section along with a variation of the cable in FIG. 2 and the CTEs for similar separated carrier sections of conventional figure-eight fiber optic drop cables.

FIG. 5 is a line graph depicting a thermal shrinkage of four carrier sections separated from a messenger section over a predetermined temperature range. Calculating the slope of the lines in FIG. 5 yields a coefficient of thermal expansion (CTE) for the respective carrier section. The first two carrier sections depicted in FIG. 5, respectively represented by lines 52 and 54, had the same constructions as the two carrier sections having two and four fiberglass strands depicted in FIG. 4 as bars 42 and 44. The second two carrier sections, respectively represented by lines 56 and 58, had the same construction as the two carrier sections having two and four rovings 23 according to the present invention depicted in FIG. 4 as bars 46 and 48.

The thermal shrinkage test measured the thermal shrinkage of a carrier section of a figure-eight cable that was separated from the messenger section over the temperature range of about −60° C. to about 70° C. The thermal shrinkage test measured a 20 meter sample of the respective figure-eight cables prior to separating the respective carrier sections. Specifically, the respective cables were marked at their midpoints and at respective intervals of 1 meter. Thereafter, the carrier sections were separated from the messenger section and attached to a kiln-dried board having markings disposed 1 meter apart along the length. Specifically, the markings on the respective carrier sections were aligned with the markings on the board at a first end of both. At the first end, the carrier section was fixed so that it was unable to move, but the rest of the carrier section was free to shrink along the linearly attached length. Next, the board and carrier we placed into a thermal chamber and length measurements of the carrier section were measured as the temperature was varied over the temperature range. The results were then plotted obtain FIG. 5.

Figure 6:
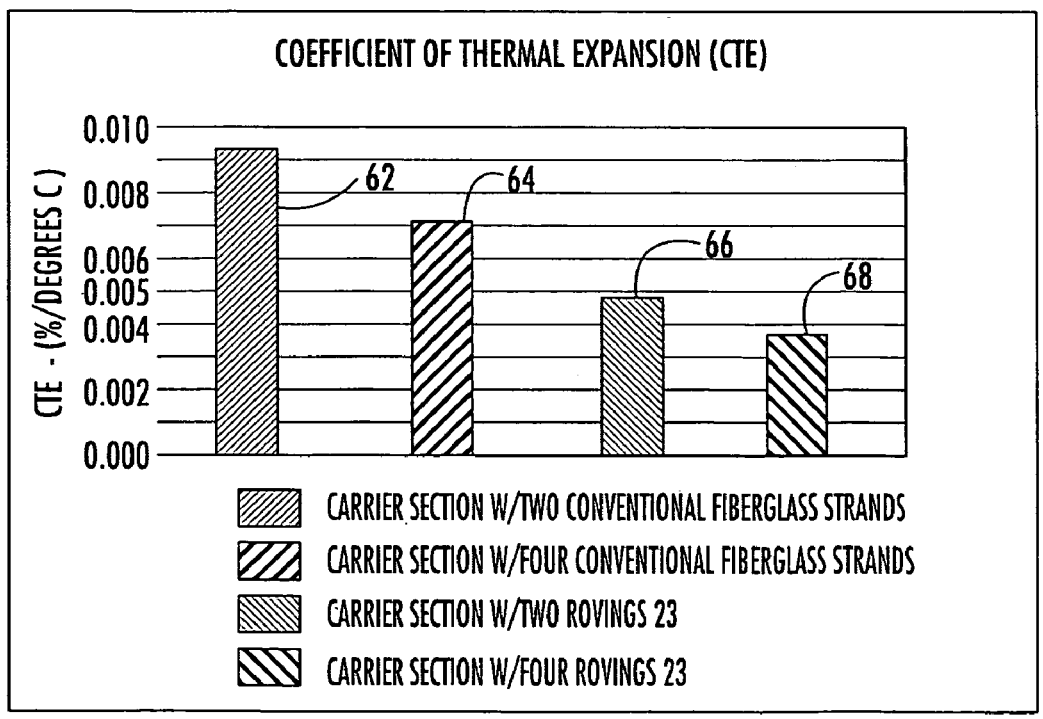

FIG. 6 is a bar graph summarizing the slopes of the lines of FIG. 5 which are the respective CTE for the tested carrier samples in the thermal shrinkage test. As shown in Table 1, the carrier sections of the figure-eight drop cables of the present invention surprisingly have a much smaller CTE, than comparable carrier sections of the conventional cables. Specifically, bar 66 has a CTE that is about 55% of the CTE of bar 62 and bar 68 has a CTE that is about 57% of the CTE of bar 64. Thus, the carrier sections of cables of the present had an average coefficient of thermal expansion (CTE) of the carrier section of about $5.0 \times 10^{-3}$%/° C. or less, and more preferably, the CTE is about $4.0 \times 10^{-3}$%/° C. or less.

TABLE 1

| CTE values for FIG. 6 | |
|---|---|
| Bar | CTE %/° C. |
| 62 | 0.009 |
| 64 | 0.007 |
| 66 | 0.005 |
| 68 | 0.004 |

Additionally, cables of the present invention can be advantageously coiled without inducing elevated levels of attenuation due to their relatively low-shrinkage. For instance, if a coiled figure-eight cable has elevated levels of shrinkage in the carrier section, the carrier section of the coiled cable tends to rotate to the inner diameter of the coil, thereby causing elevated levels of attenuation. Figure-eight cables of the present invention generally do not have this problem so that they are suitable for coiling for slack storage. Likewise, other cable designs can be coiled without inducing elevated levels of optical attenuation.

Figure 7:
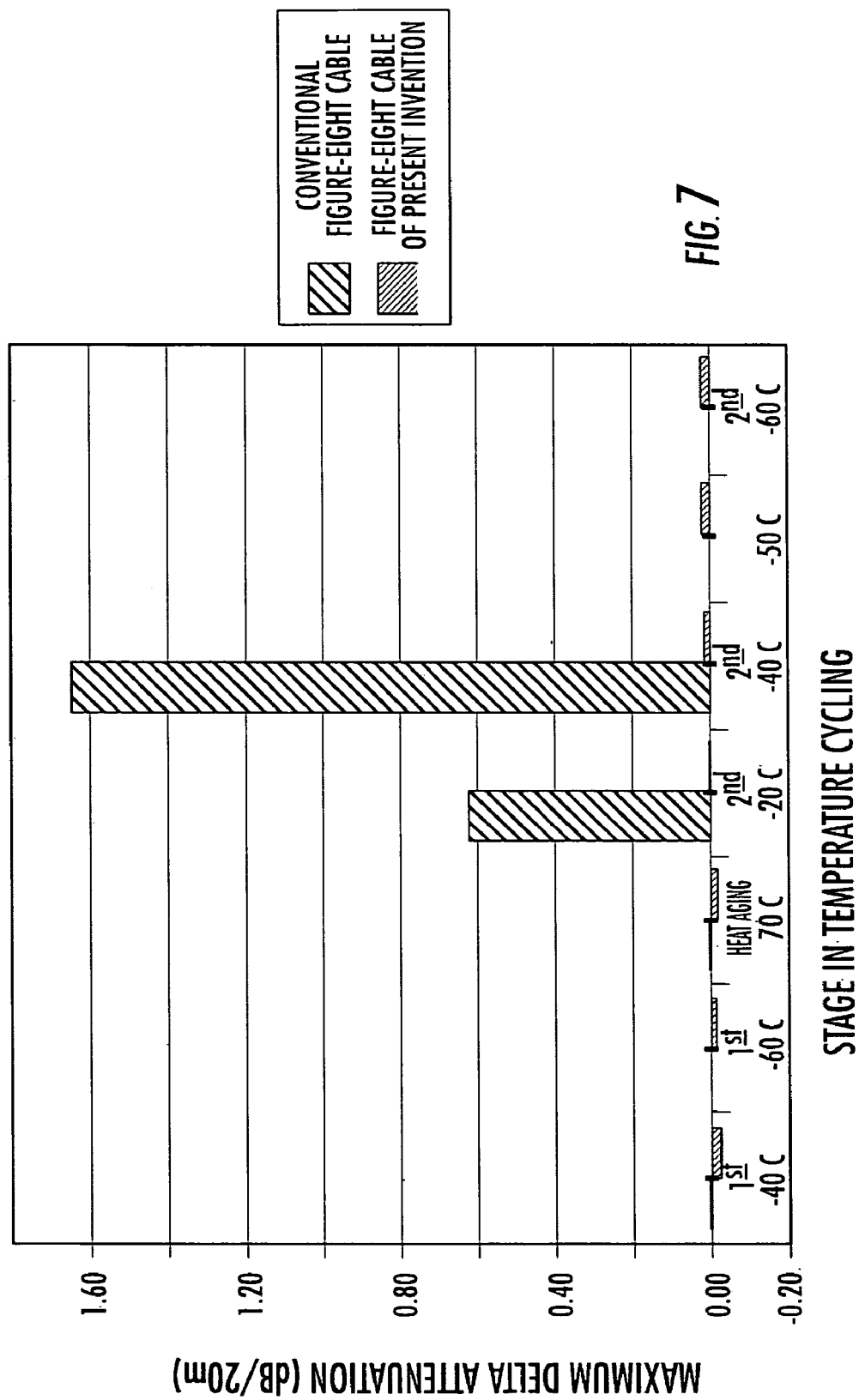
FIG. 7 is a bar graph depicting maximum delta attenuation for the cable of FIG. 2 and a similar conventional fiber optic cable during thermal cycling testing at a reference wavelength of 1550 nm.
Figure 8:
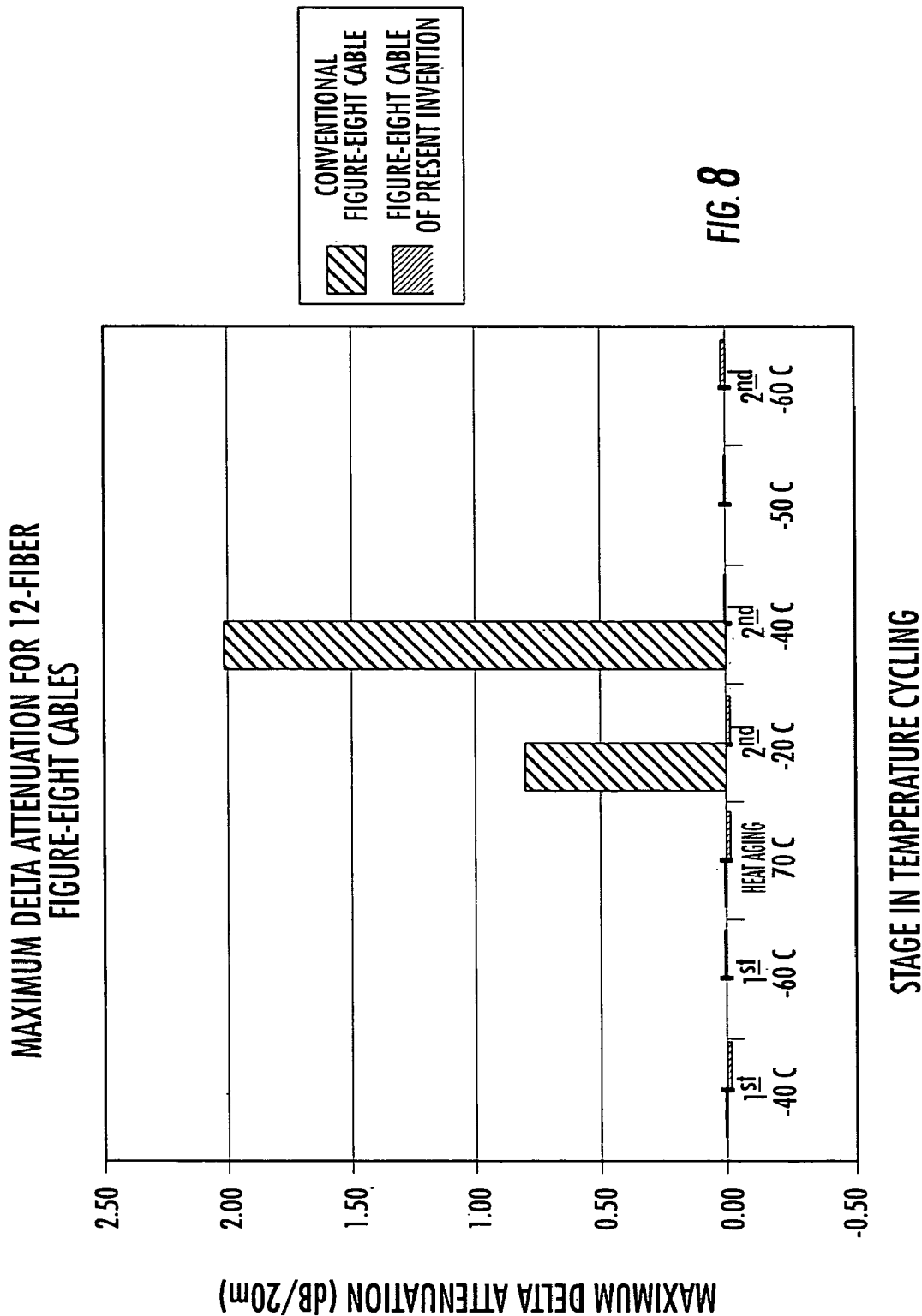
FIG. 8 is a bar graph depicting maximum delta attenuation for a cable similar to FIG. 2 except it included twelve optical fibers therein and a similar conventional fiber optic cable during thermal cycling testing at a reference wavelength of 1550 nm.

FIG. 7 depicts a bar graph showing maximum delta attenuations for the four fiber cable of FIG. 2 and a similar conventional fiber optic cable during thermal cycling testing at a reference wavelength of 1550 nm. Likewise, FIG. 8 is a bar graph depicting maximum delta attenuation for a cable similar to FIG. 2, except it included twelve optical fibers therein and a similar conventional fiber optic cable during thermal cycling testing at a reference wavelength of 1550 nm. This temperature cycling was performed per the test procedures of ICEA 717/S-87-717, ANSI/S-87-640, and FOTP-3 with added measurements for the cables of the present invention at −50° C. and −60° C. to examine performance at these ultra-low temperatures. However, FIGS. 7 and 8 merely illustrate the interesting temperature cycling stages, namely, low temperature performance before heat aging and low temperature performance after heat aging.

The maximum delta attenuation testing was performed by taking a 60 meter sample of cable and separating a 20 meter carrier section of the cable roughly centered in the middle of the length. Hence, the maximum delta attenuation is reported for a length of 20 meters, rather than the typical value of dB/km. The separated carrier section was placed in a temperature chamber through suitable portals and the temperature cycling according to the above mentioned test procedure was initiated. Optical measurements were made using a suitable optical source and power meter. Some of the maximum delta attenuation values for FIGS. 7 and 8 are relatively low and are represented by small bars on FIGS. 7 and 8 that are not drawn to scale. Tables 2 and 3 respectively summarize the values of the maximum delta attenuations for FIG. 7 and FIG. 8 and have units of dB/20 m.

TABLE 2

Maximum Delta Attenuation Values for 4-fiber carrier sections of FIG. 7

| Cable | 1st −40° C. | 1st −60° C. | Heat Aging | −20° C. | 2nd −40° C. | −50° C. | 2nd −60° C. |
|---|---|---|---|---|---|---|---|
| Conventional | 0.00 | — | 0.00 | 0.61 | 1.64 | — | — |
| Present Invention | −0.01 | 0.00 | −0.01 | −0.01 | 0.00 | 0.00 | 0.01 |

TABLE 3

Maximum Delta Attenuation Values for 12-fiber carrier sections of FIG. 8

| Cable | 1st −40° C. | 1st −60° C. | Heat Aging | −20° C. | 2nd −40° C. | −50° C. | 2nd −60° C. |
|---|---|---|---|---|---|---|---|
| Conventional | 0.00 | — | 0.00 | 0.81 | 2.01 | — | — |
| Present Invention | −0.02 | −0.01 | −0.02 | 0.00 | 0.01 | 0.02 | 0.02 |

As shown by both FIGS. 7 and 8, the performance of the carrier sections of the conventional cables and the cables of the present invention have a similar performance before heat aging at 70° C. However, after heat aging the carrier sections of the present invention show a drastic difference in delta attenuation. As shown in both FIGS. 7 and 8, the optical performance of the conventional cables degrade at low temperatures after heat aging, thereby making them unsuitable for splitting the carrier section from the messenger section in outdoor applications. On the other hand, the carrier sections of the present invention have surprisingly low delta attenuation levels. Specifically, optical waveguides in cables of the present invention preferably have a maximum delta attenuation of about 0.3 dB/20 meters or less, and more preferably about 0.1 dB/20 meters or less, at a reference wavelength of about 1550 nm at a temperature of about −40° C. after heat aging at 70° C. Additionally, the cables of present invention maintain these performance levels down to a temperature of about −60° C. after heat aging.

Figure 9:
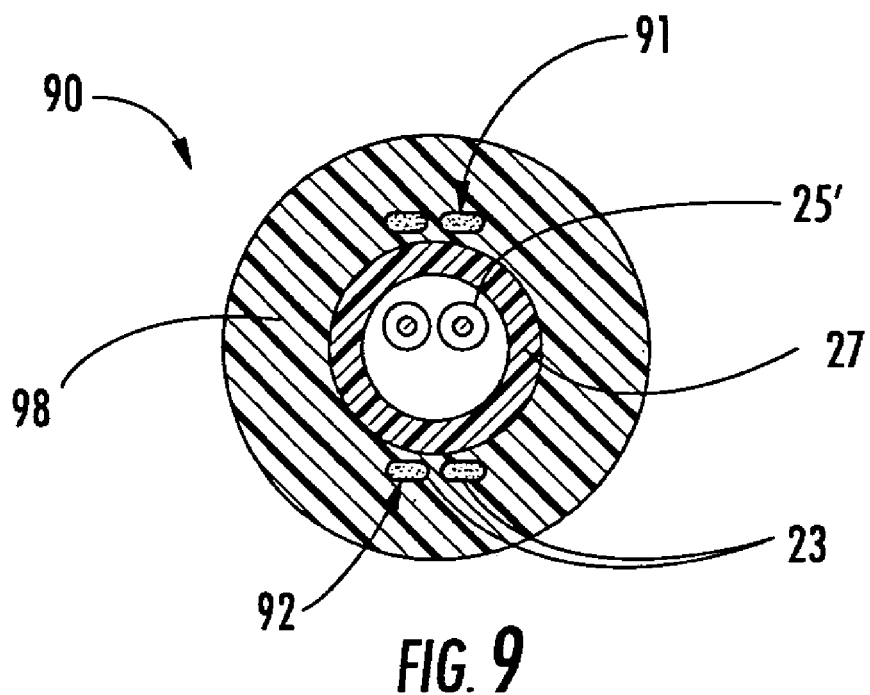
FIGS. 9–13 depict cross-sectional views of other fiber optic cable according to the present invention.

Other cable configurations besides figure-eight cables are advantageous with the concepts of the present invention. For instance, FIG. 9 depicts cable 90 according to the present invention. Cable 90 includes at least one optical waveguide 25', a buffer tube 27, a plurality of rovings 23, and a cable jacket 28. As shown, the four rovings 23 of cable 90 are arranged as a plurality of clusters of rovings 91,92 that are disposed at generally symmetrical locations. In this case, clusters of rovings 91,92 are generally disposed about 180 degrees apart, but other suitable arrangements, configurations and/or locations of the clusters of rovings are possible. Of course, larger numbers of rovings 23 can be used in clusters to meet the cable requirements. In other words, since cable 90 does not include a messenger section like the above described figure-eight cables it may require more rovings 23 in order to have a suitable tensile rating. Furthermore, cables of the present invention can have other shapes besides round such as oval or flat.

Figure 10:
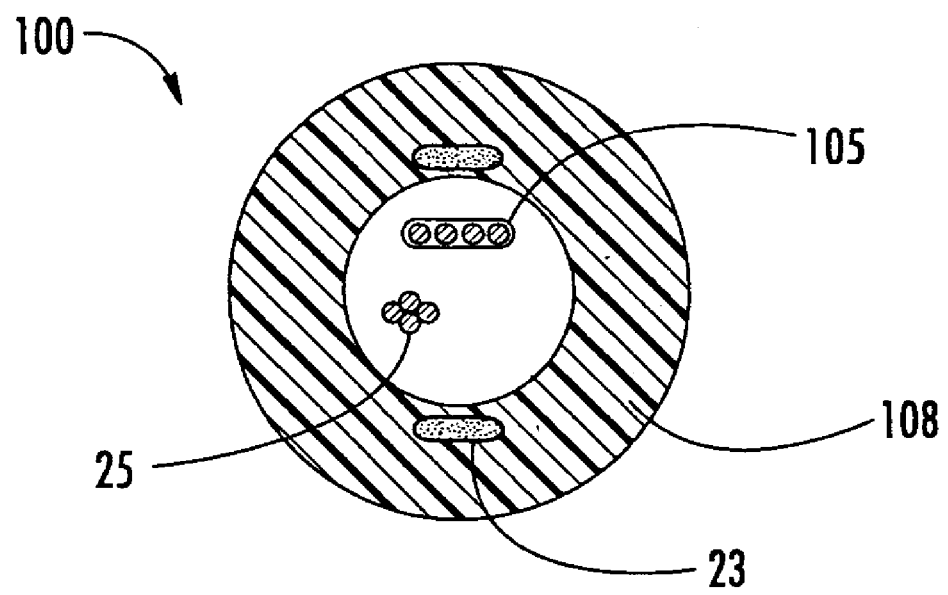

Optical waveguides 25' are single-mode optical fibers having a buffer layer (not numbered); however, other types or configurations of optical fibers can be used. The buffer layer of optical fiber 25' can be a thermoplastic or UV curable material that upcoats the optical fiber for protection. For instance, a 250 micron optical fiber may be upcoated to a diameter of 500 or 900 microns; however, other suitable dimensions are possible. Optical fibers may be multi-mode, pure-mode, erbium doped, polarization-maintaining fiber, other suitable types of light waveguides, and/or combinations thereof. For instance, each optical fiber can include a silica-based core that is operative to transmit light and is surrounded by a silica-based cladding having a lower index of refraction than the core. Additionally, one or more coatings are applied to the optical fiber, thereby forming the optical fiber. For example, a soft primary coating surrounds the cladding, and a relatively rigid secondary coating surrounds the primary coating. The coating can also include an identifying means such as ink or other suitable indicia for identification and/or an anti-adhesion agent that inhibits the removal of the identifying means. Additionally, optical waveguides can be disposed in ribbons or bundles as shown in FIG. 10 or other suitable packaging configurations. Suitable optical fibers are commercially available from Corning Incorporated of Corning, N.Y.

Buffer tube 27 is preferably constructed of a polymeric material and is suitably dimensioned for receiving the optical waveguides therein. However, other suitable materials and shapes can be used for buffer tube 27. Buffer tube 27 of the present invention can also include additives for improving flame-retardance; however, any other suitable additives can be used. Additionally, tube 27 can be, for example, extruded as a continuous unit or be manufactured from one or more polymeric flat tapes that are formed and sealed, thereby forming the buffer tube. Additionally, buffer tube 27 can have other suitable components or features such as a water-swellable material thereon or a ripcord within a tube wall. Likewise, cable jacket 28 is preferably constructed from a suitable polymeric material. Moreover, the cable jacket can include ripcords embedded therein for opening a portion of the same.

FIG. 10 depicts another cable 100 according to the present invention. Cable 100 is similar to cable 90, except it is a tubeless design. As depicted, cable 100 includes a fiber optic ribbon 105 and a plurality of optical waveguides 25 in a bundle. Generally speaking, excluding the tube in cable 100 results in less expensive material cost for cable 100 and eliminates the step of opening a buffer tube to access the optic fibers.

Figure 11:
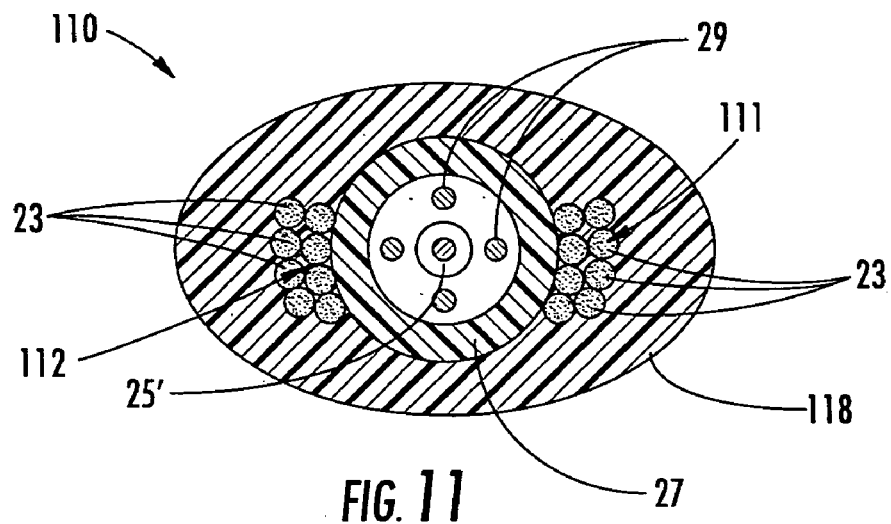
Figure 12:
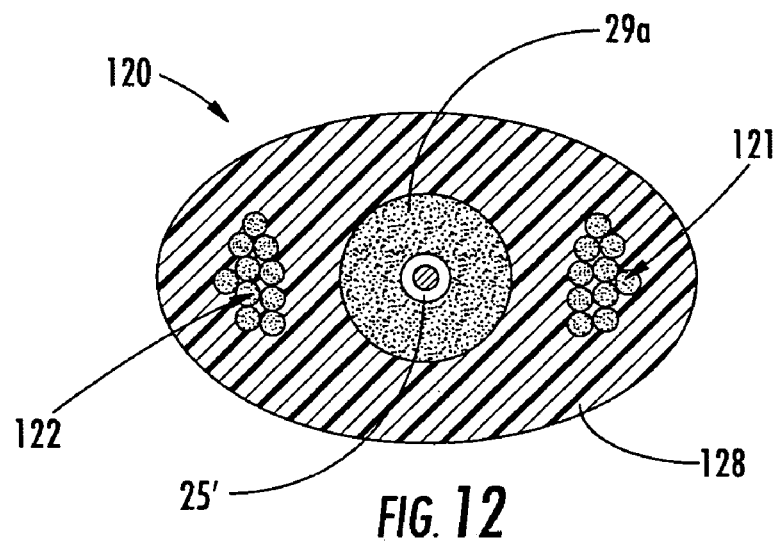

FIGS. 11 and 12 depict cables 110 and 120 using the concepts of the present invention. Cable 110 includes at least one optical fiber 25' having a buffer layer (not numbered), a buffer tube 27, at least one water-swellable component 29, two clusters of rovings 111,112, and a cable jacket 118. Cable 120 is similar to cable 110, but is a tubeless configuration with clusters of rovings 121,122 disposed within cable jacket 128 rather than being at least partially in contact with buffer tube 27. Also, cable 120 includes a water-blocking component 29a such as a thixotropic grease or gel within a cavity (not numbered), instead of the water-swellable component within the tube. The cables of FIGS. 11 and 12 are advantageous because they have a relatively low-cost, high degree of flexibility, preserve optical performance and work well in clamping devices such as P-clamps. In other words, there is an adequate degree of coupling between rovings 23 and the cable jacket to inhibit shrinkage and buckling while still allowing for slack storage and use in clamping devices.

Clusters of rovings preferably each have about the same tensile stiffness using similar numbers of rovings 23 in each cluster, thereby balancing the cable. The tensile stiffness of the entirety of the rovings of cables of the present invention are preferably in the range of about 700 kN or less, which allows the cable to aerially span distances up to, for instance, about 300 feet, but other tensile stiffness rating ranges are possible. Preferably, the tensile stiffness of the cable meets the NESC loading requirements for the desired application. As used herein, tensile stiffness is a measure of the tensile strength of the cluster of rovings and is calculated by multiplying the tensile modulus of elasticity (E) by the cross-sectional area (A) of the cluster of rovings to arrive at the EA rating. In one exemplary cable suitable for spans of about 150 feet, the total tensile modulus of elasticity is about 72 GPa and the total load bearing cross-sectional area, i.e., the area excluding the resin matrix, is about 4.2 mm$^2$ for the two clusters of rovings. Resulting in a tensile stiffness of about 300 kN, i.e., a tensile stiffness of about 150 kN for each cluster of rovings; however, other suitable values for the tensile modulus of elasticity E and the cross-sectional area A are possible, yielding different tensile stiffness values. Additionally, cables can include more than two clusters of rovings and/or clusters of rovings can have different tensile stiffness values, arrangements, or the like.

Using one or more clusters of rovings positioned against buffer tube 27 in a flat or oval cable has several advantages. First, the cluster of rovings are located in known positions, thereby simplifying finding the clusters of rovings during connectorization. Second, the rovings positioned adjacent to buffer tube 27 and/or in the center of the cluster, generally speaking, do not bond or have limited bonding with the cable jacket. In other words, the rovings positioned against the buffer tube do not bond with buffer tube since it has cooled before the rovings are applied. Consequently, it is relatively easy to fan-out several of the rovings, i.e., separate the rovings from the cable jacket and buffer tube so that rovings can be attached to the connector for providing strain relief while some of the rovings are at least partially bonded with the cable jacket for inhibiting shrinkage. Additionally, using a generally flat or oval cross-section for the cable advantageously allows for the use of a P-clamp or other suitable clamping device. In the case of cables of FIGS. 11 and 12, each cluster of rovings 111,112 includes seven to ten rovings 23 with each individual roving being about 800 tex in size. Of course, cables of the present invention could use one or more relatively large rovings 23 such as a roving on each side of the tube or cavity having about a 7350 tex rating, but other suitable sizes and/or numbers of rovings are possible according to the present invention to achieve the desired tensile stiffness.

Cables 110 and 120 also include at least one water-swellable component 29 and/or water-blocking component 29a. As depicted, cable 110 includes a plurality of water-swellable yarns within tube 27 and cable 120 includes a water-swellable substance (not visible) on one or more rovings 23. Although, water-swellable components 29 and water-blocking component 29a of cables 110,120 are depicted within the tube or cavity, cables can have these components disposed outside the tube or cavity. For instance, a water-swellable tape can be wrapped about the tube or a water-blocking grease can fill interstices among rovings 23. Of course, other suitable locations for water-swellable or water-blocking components are possible.

Cables similar to those in FIGS. 11 and 12 were tested for the average shrinkage using a second average shrinkage test similar to the average shrinkage discussed above. Except, the second average shrinkage test increased the exposure temperature and time for the 1 meter samples of cable. Specifically, the respective 1 meter cable samples were placed in a thermal chamber set at about 110° C. for at least two hours and then removed and allowed to cool to an ambient room temperature of about 20° C. before measuring the average shrinkage. The cable samples tested advantageously had minimal shrinkage on the order of about 0% to about 0.2% shrinkage during the second average shrinkage test. Additionally, the range of differences between the EFL and average shrinkage may be the same as discussed above. Likewise, the EFL and average shrinkage can be added together as a sum that is related to a contraction window for the cable. By way of example, the sum of EFL plus the average shrinkage may be the same as discussed above.

Figure 13:
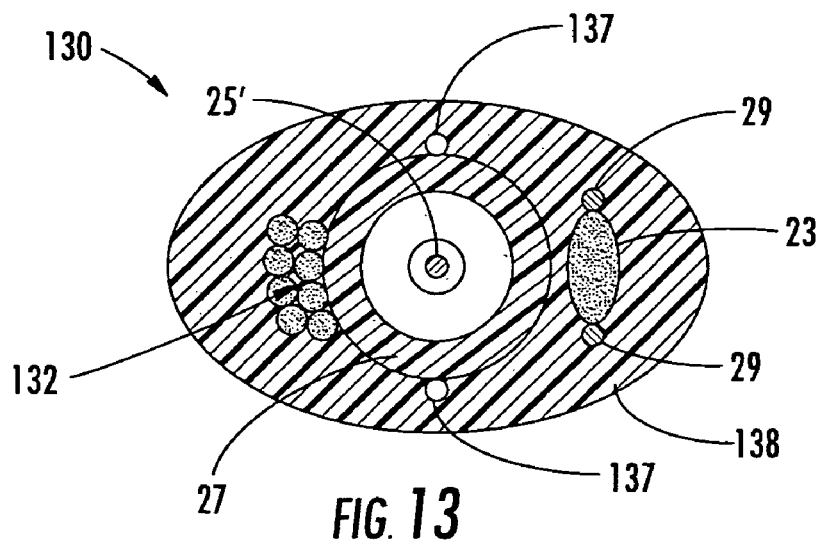

Of course other suitable cable designs are possible. FIG. 13 is a cross-sectional view of a cable 130 that depicts other variations. Although, cable 130 has different arrangements on each side of the cable for explanatory purposes, cables preferably have similar arrangements on each side. Specifically, the right portion of cable 130 includes a relatively large roving 23 and one or more water-blocking threads 29 disposed adjacent to the large roving 23. In further embodiments, one or more water-blocking threads may be wrapped about tube 27 or the cluster of rovings. On the other hand, the left portion of cable 130 includes a plurality of rovings 23 in a cluster 132. Cluster 132 further includes at least one roving having a water-swellable substance depicted by the shading of the rovings. In other embodiments, the shaded roving could be replaced by one or more water-swellable threads within the cluster. Cable 130 also includes a pair of ripcords 137 for aiding in the removal of jacket 138.

Figure 14:
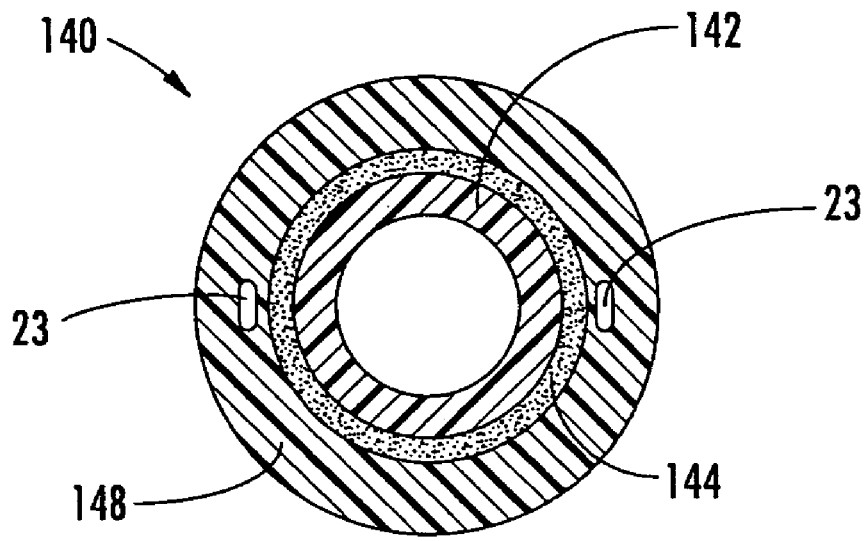
FIG. 14 depicts a cross-sectional view of a protective casing according to the present invention.
Figure 15:
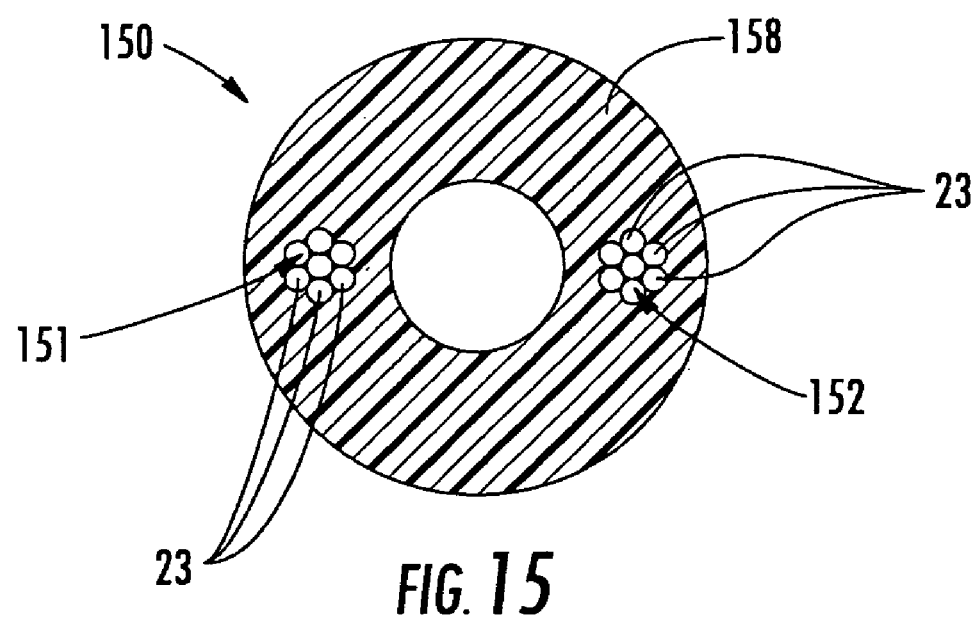
FIG. 15 depicts a cross-sectional view of another protective casing according to the present invention.

The concepts of the present invention can also be used in other structures for protecting optical fibers. For instance, FIG. 14 depicts a protective casing 140 including an inner tube 142, a plurality of strength yarns 144, an outer tube 148, and at least one roving 23. Protective casing 140 has characteristics that are similar to those discussed herein with respect to cable characteristics. Roving 23 is at least partially bonded or attached with outer tube 148. Outer tube 148 is preferably formed from a UV resistant material such as a medium density polyethylene jacket; however, other suitable materials are possible. Moreover, outer tube 148 and/or inner tube 142 can also include any other suitable additive(s) to enhance performance such as UV resistance and/or flame retardance. Likewise, FIG. 15 depicts a cross-sectional view of another protective casing 150 having one or more clusters 151,152 of rovings 23 at least partially disposed within a tube 158.

Figure 16:
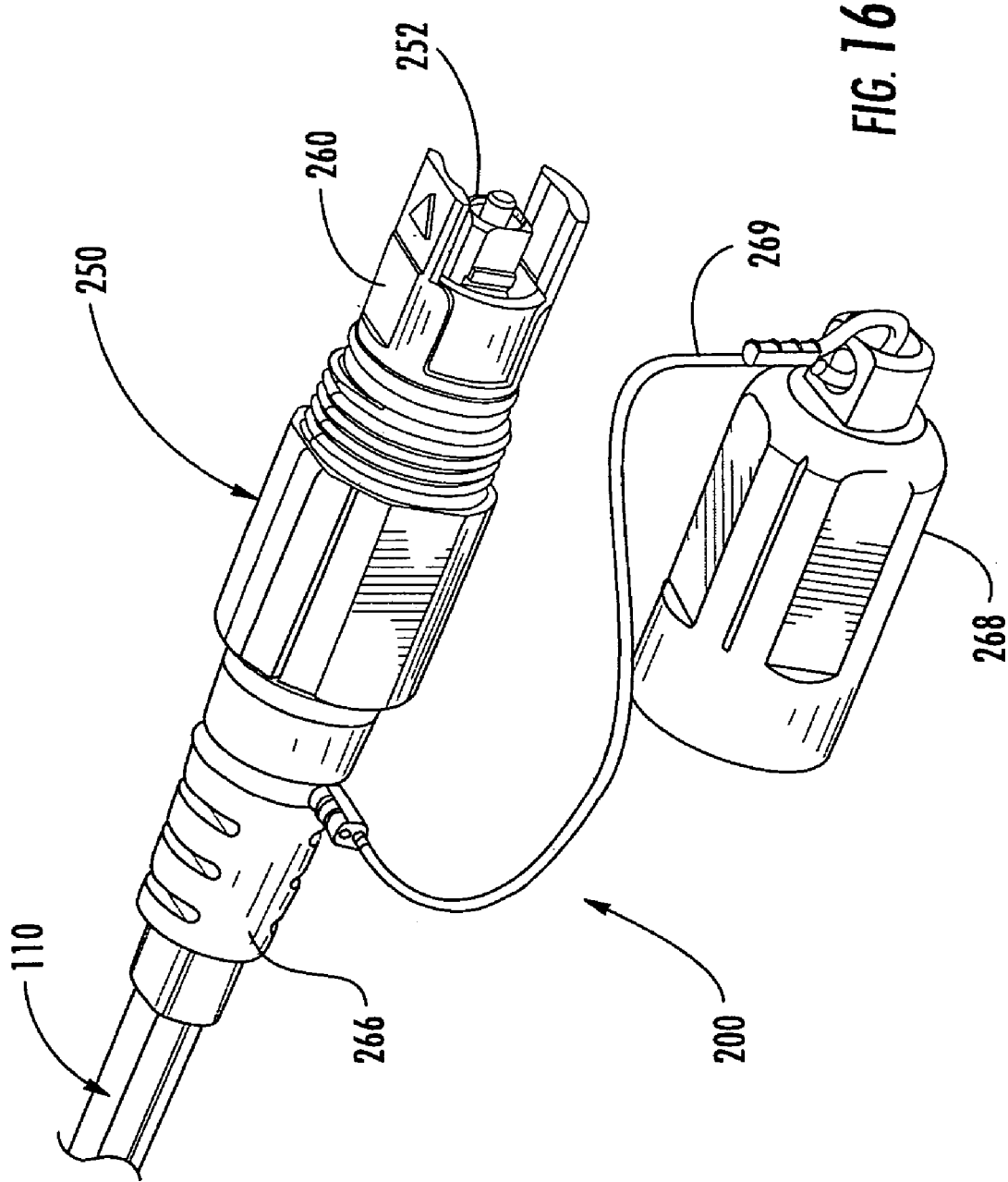
FIG. 16 is an assembled perspective view of the preconnectorized fiber optic drop cable according to the present invention.

Cables of the present invention can also be preconnectorized in a factory environment, thereby simplifying field installation to the subscriber. Additionally, the cables of the present invention also provide flexibility in the connectorization process of the fiber optic cable. In other words, a connector can grip one or more of the rovings, strength members and/or strength components as desired. FIG. 16 depicts a perspective view of one end of an exemplary preconnectorized fiber optic cable assembly 200 using fiber optic cable 110 and an optical plug connector 250 using a connector assembly 252 of a SC type. But, of course, other types of connector assemblies such as LC, FC, ST, MT, and MT-RJ are contemplated by the present invention by using a suitable crimp housing. In this embodiment, optical plug connector 250 merely crimps to rovings 23, but other suitable arrangements crimping arrangements contemplated by the present invention.

Figure 17:
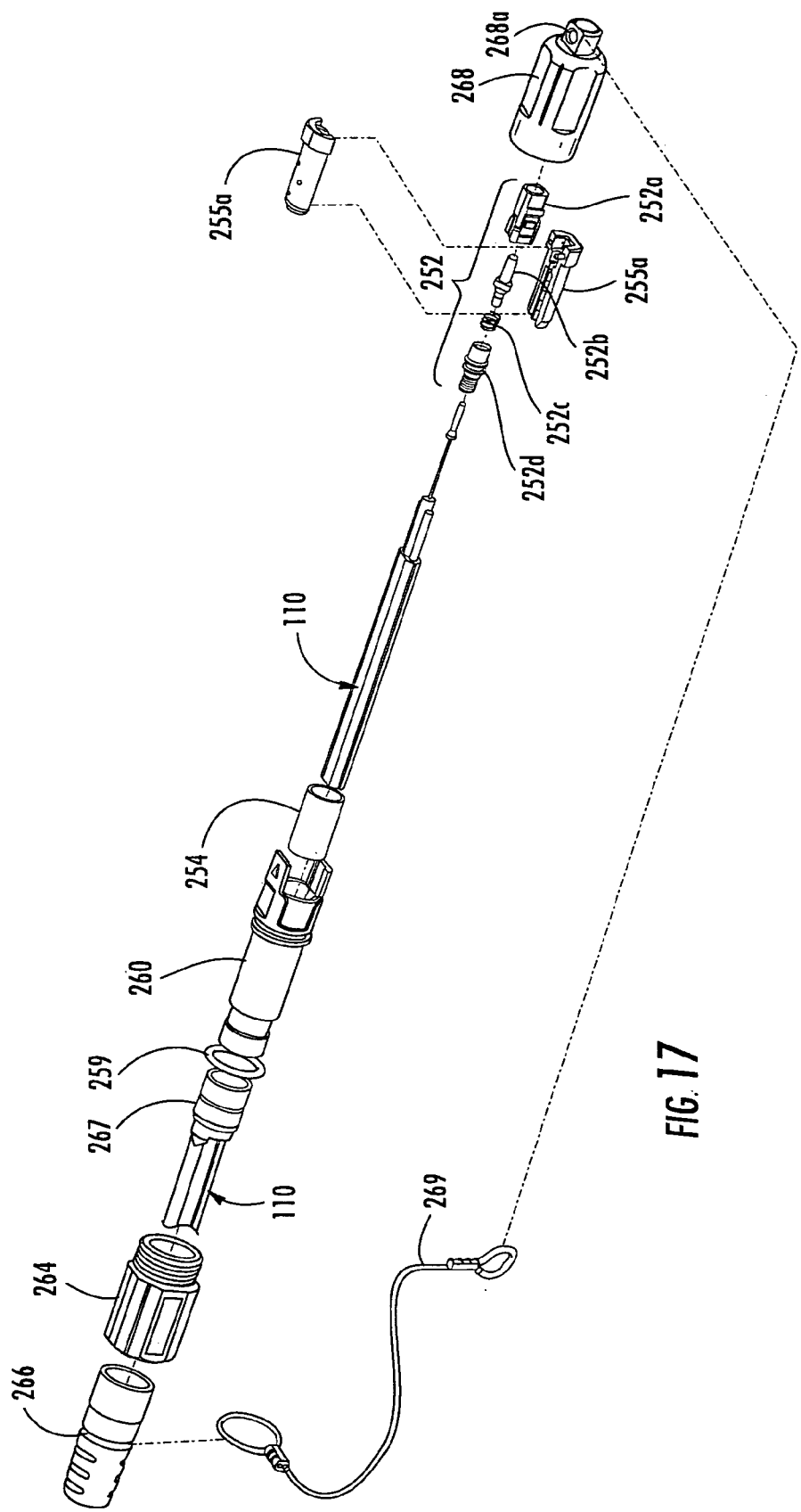
FIG. 17 is an exploded view of the preconnectorized fiber optic drop cable of FIG. 16.

FIG. 17 depicts an exploded view of preconnectorized cable assembly 200 showing cable 110 and plug connector 250. In this embodiment, plug connector 250 includes an industry standard SC type connector assembly 252 having a connector body 252a, a ferrule 252b in a ferrule holder (not numbered), a spring 252c, and a spring push 252d. Plug connector 250 also includes a crimp assembly (not numbered) that includes a crimp housing having at least one half-shell 255a and a crimp band 254, a shroud 260 having an O-ring 259, a coupling nut 264, a cable boot 266, a heat shrink tube 267, and a protective cap 268 secured to boot 266 by a wire assembly 269.

Generally speaking, most of the components of plug connector 250 are formed from a suitable polymer. Preferably, the polymer is a UV stabilized polymer such as ULTEM 2210 available from GE Plastics; however, other suitable materials are possible. For instance, stainless steel or any other suitable metal may be used for various components.

Figure 19A:
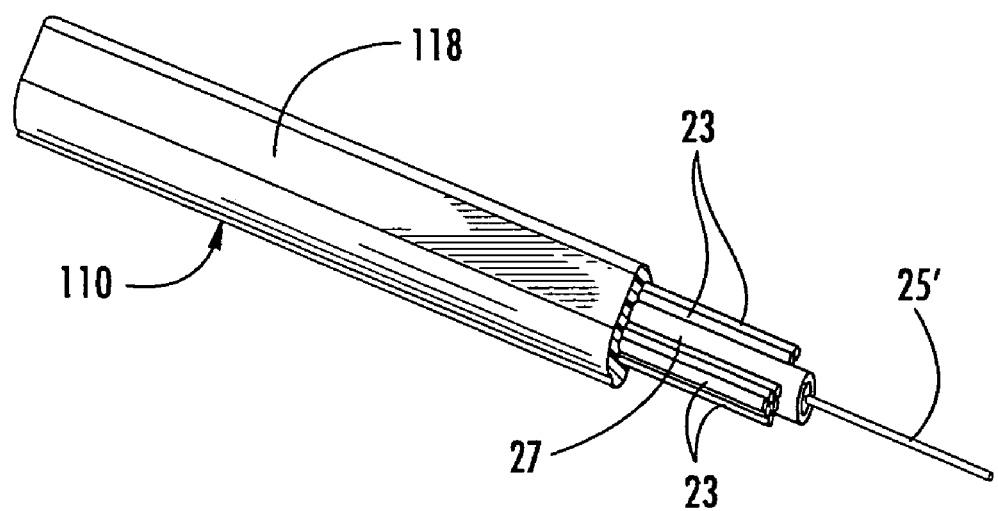
FIG. 19a–19d depict several steps during the process of attaching the crimp assembly to the cable of FIG. 11.
Figure 19B:
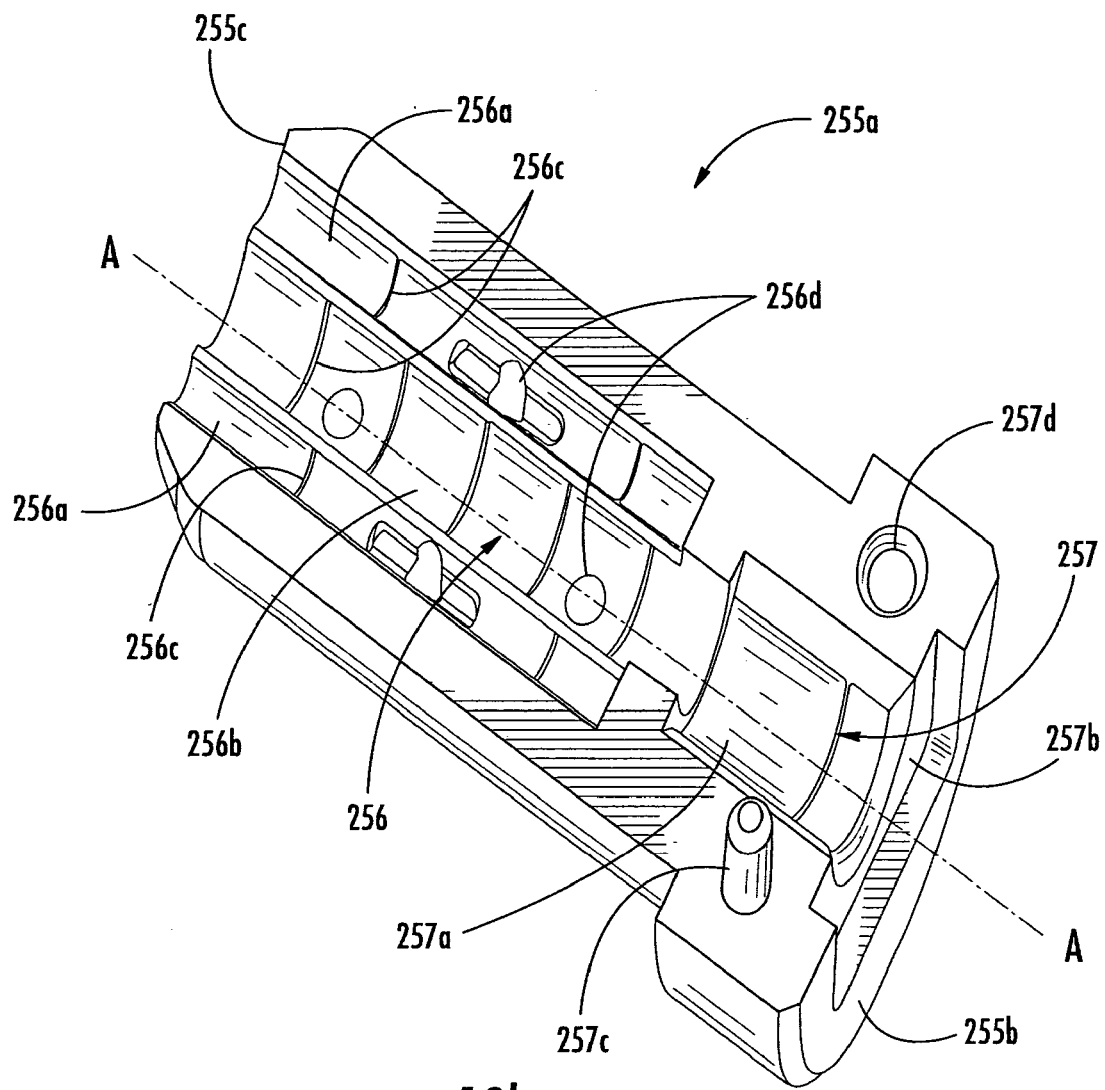
Figure 19C:
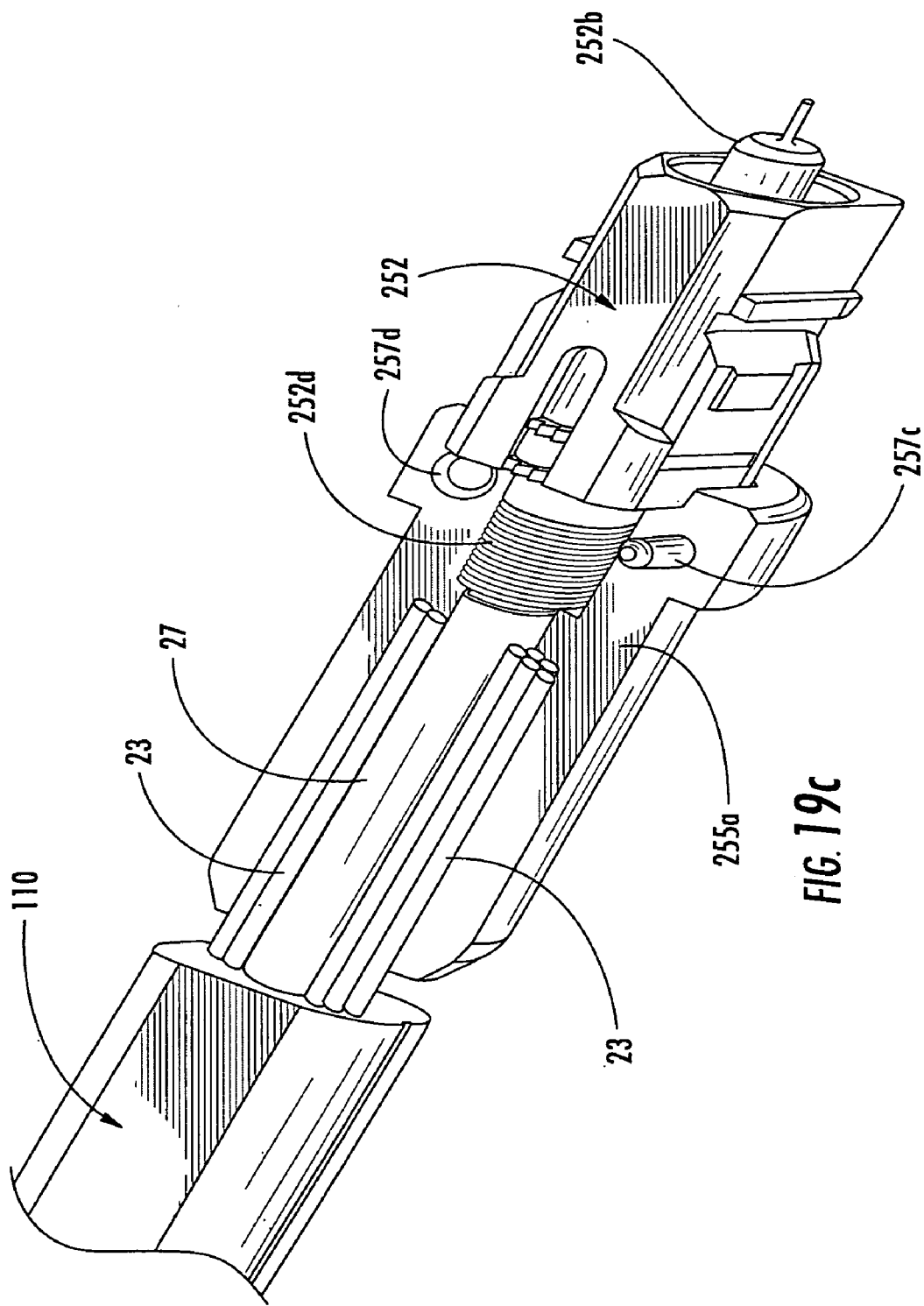
Figure 19D:
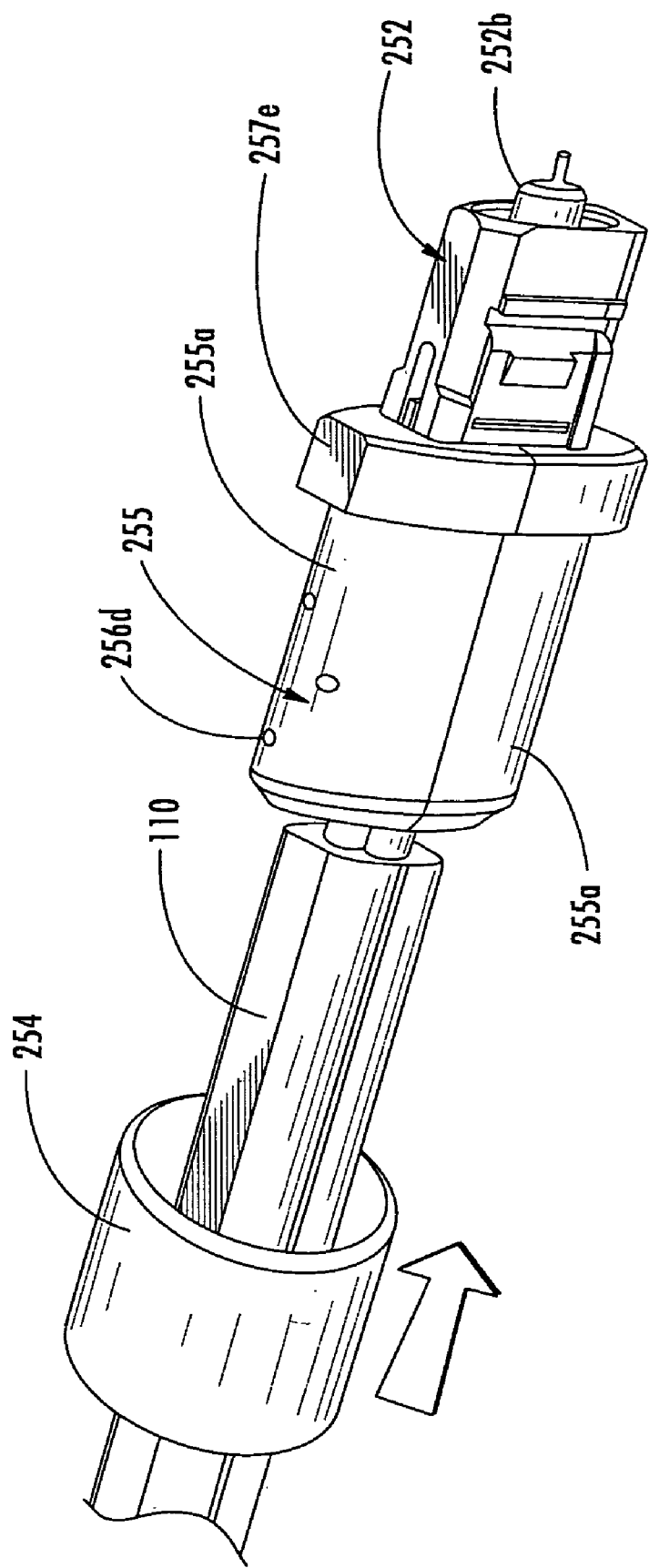

As best shown in FIG. 19d, the crimp assembly includes crimp housing 255 and crimp band 254. Crimp housing 255 has two half-shells 255a that are held together by crimp band 254 when the preconnectorized cable is assembled. Although, the term half-shell is used, it is to be understood that it means suitable shells and includes shells that are greater than or less than half of the crimp housing. Crimp band 254 is preferably made from brass, but other suitable crimpable materials may be used. Crimp housing 255 is configured for securing connector assembly 252 as well as providing strain relief to cable 110. This advantageously results in a relatively compact connector arrangement using fewer components. Moreover, the crimp assembly allows preconnectorized assembly cable 200 to be assembled quickly and easily. Of course, other embodiments are possible according to the present invention. For instance, connector body 252a may be integrally molded into crimp housing 255 in a ST type configuration so that a twisting motion of the crimp housing secures the ST-type connector with a complementary mating receptacle.

FIGS. 19a–19d depict several steps during the process of attaching the crimp assembly to cable 110. FIG. 19a shows cable 110 having water-swellable yarns 29 (not visible) cut flush with tube and jacket 118 cut back, thereby exposing the two clusters of rovings 23 along with buffer tube 27 and optical fiber 25' from the end of cable 110. FIG. 19b shows the inner surface of one half-shell 255a. In this case, only one half-shell 255a is illustrated since two symmetrical half-shells are used for both halves of crimp housing 255. In other embodiments there may be a first half-shell and a second half-shell, which are different. For instance, one half-shell may have two alignment pins, rather than each half-shell having a single alignment pin.

As shown in FIG. 19b, half-shell 255a includes a first end 255b for securing connector assembly 252 and a second end 255c that provides strain relief. A longitudinal axis A—A is formed between first end 255b and second end 255c near the center of crimp housing 255, through which half of a longitudinal passage is formed. When assembled, the optical fiber passes through the longitudinal passage and is held in a bore of ferrule 252b. Additionally, half-shell 255a includes a cable clamping portion 256 and a connector assembly clamping portion 257.

Cable clamping portion 256 has two outboard half-pipe passageways 256a and a central half-pipe passageway 256b that is generally disposed along longitudinal axis A—A. Half-pipe passageways 256a and 256b preferably include at least one rib 256c for securely clamping tube 27 and rovings 23 after crimp band 254 is crimped, thereby completing the crimp assembly. Moreover, half-pipe passageways 256a and 256b are sized for the strength elements, in this case, strength components of cable 110, but the passageways can be sized for different crimping/cable configurations.

Likewise, half-shell 255a has a connector assembly clamping portion 257 that is sized for attaching connector assembly 252. Specifically, connector assembly clamping portion 257 has a half-pipe passageway 257a that opens into and connects central half-pipe passageway 256b and a partially rectangular passageway 257b. Half-pipe passageway 257a is sized for securing spring push 252d and may include one or more ribs for that purpose. Rectangular passageway 257b holds a portion of connector body 252a therein and inhibits the rotation between connector assembly 252 and the crimp assembly. FIG. 19c depicts prepared cable 110 of FIG. 19a having connector assembly 252 attached and positioned in a first half-shell 255a. The alignment of the two half shells is accomplished by inserting pins 257c into complementary bores 257d of the two half-shells. FIG. 6d shows both half-shells 255a of crimp housing 255 disposed about cable 110 before crimp band 254 is installed thereover. Additionally, half-shells may include one or more bores 256d that lead to one of half-pipe passageways 256a or 256b. Bores 256d allow for inserting an adhesive or epoxy into the crimp housing 255, thereby providing a secure connection for strain relief.

When fully assembled the crimp assembly fits into shroud 260. Additionally, crimp housing 255 is keyed to direct the insertion of the crimp assembly into shroud 260. In this case, half-shells 255a include planar surfaces 257e (FIG. 19d) on opposites sides of crimp housing 255 to inhibit relative rotation between crimp housing 255 and shroud 260. In other embodiments, the crimp assembly may be keyed to the shroud using other configurations such as a complementary protrusion/groove or the like.

Shroud 260 has a generally cylindrical shape with a first end 260a and a second end 260b. Shroud generally protects connector assembly 252 and in preferred embodiments also keys plug connector 250 with a respective mating receptacle (not shown). Moreover, shroud 260 includes a through passageway between first and second ends 260a and 260b. As discussed, the passageway of shroud 260 is keyed so that crimp housing 254 is inhibited from rotating when plug connector 250 is assembled. Additionally, the passageway has an internal shoulder (not numbered) that inhibits the crimp assembly from being inserted beyond a predetermined position.

Figure 18A:
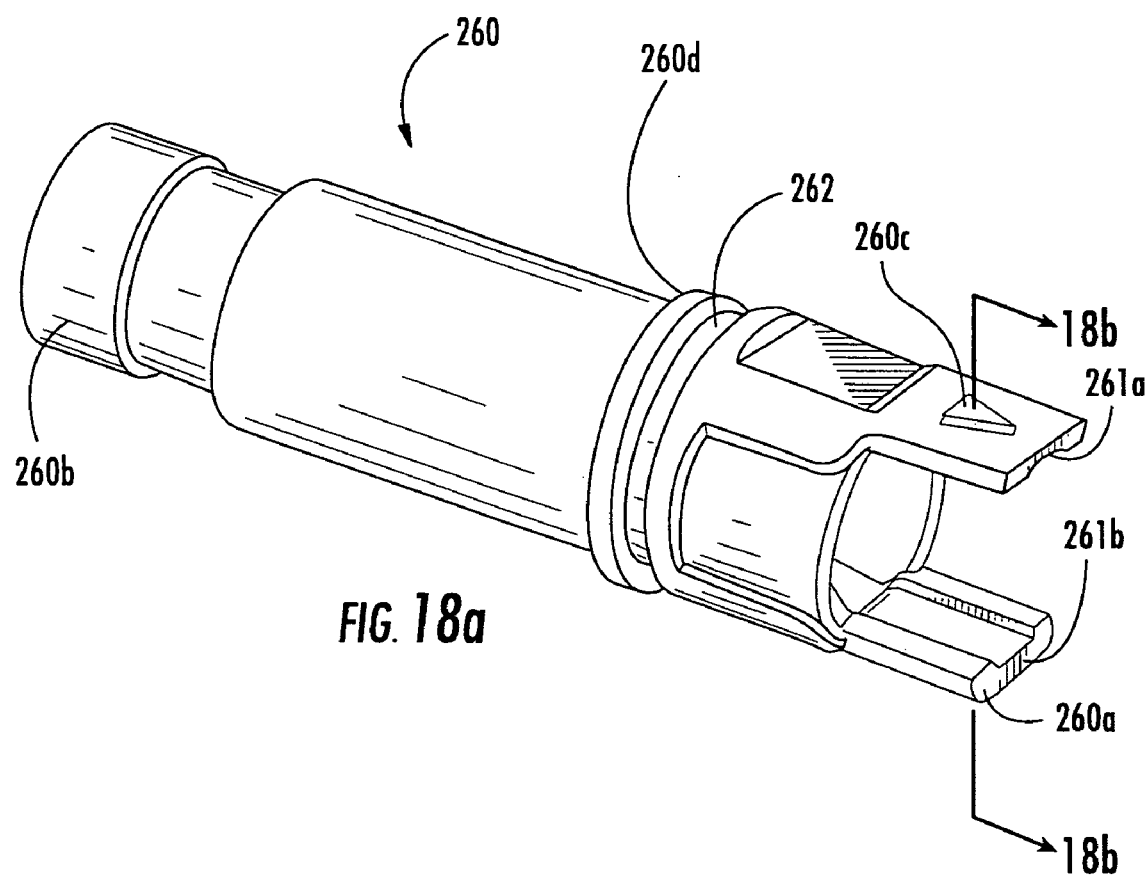
FIGS. 18a and 18b respectively are a perspective view and a sectional view of the shroud of FIG. 16.
Figure 18B:
Figure 18B:

As best shown in FIGS. 18a and 18b, first end 260a of shroud 260 includes at least one opening (not numbered) defined by shroud 260. The at least one opening extends from a medial portion of shroud 260 to first end 260a. In this case, shroud 260 includes a pair of openings on opposite sides of first end 260a, thereby defining alignment portions or fingers 261a,261b. In addition to aligning shroud 260 with receptacle during mating, alignment fingers 261a,261b may extend slightly beyond connector assembly 252, thereby protecting the same. As shown in FIG. 18b, alignment fingers 261a,261b have different shapes so plug connector 250 and the receptacle only mate in one orientation. In preferred embodiments, this orientation is marked on shroud 260 using alignment indicia 260c so that the craftsman can quickly and easily mate preconnectorized assembly cable 200 with a suitable receptacle. In this case, alignment indicia 260c is an arrow molded into the top alignment finger of shroud 260, however, other suitable indicia may be used. The arrow is aligned with complimentary alignment indicia disposed on the receptacle, thereby allowing the craftsman to align indicia so that alignment fingers 261a,261b can be correctly seated into the complimentary receptacle. Thereafter, the craftsman engages the external threads of coupling nut 264 with the complimentary internal threads of receptacle to make the optical connection.

A medial portion of shroud 260 has a groove 262 for seating an O-ring 259. O-ring 259 provides a weatherproof seal between plug connector 250 and the receptacle or protective cap 268. The medial portion also includes a shoulder 260d that provides a stop for coupling nut 264. Coupling nut 264 has a passageway sized so that it fits over the second end 260b of shroud 260 and easily rotates about the medial portion of shroud 260. In other words, coupling nut 264 cannot move beyond shoulder 260d, but coupling nut 264 is able to rotate with respect to shroud 260. Second end 260b of shroud 260 includes a stepped down portion having a relatively wide groove (not numbered). This stepped down portion and groove are used for securing heat shrink tubing 267. Heat shrink tubing 267 is used for weatherproofing the preconnectorized cable. Specifically, the stepped down portion and groove allows for the attachment of heat shrink tubing 267 to the second end 260b of shroud 260. The other end of heat shrink tubing 267 is attached to cable jacket 118, thereby inhibiting water from entering plug connector 250.

After the heat shrink tubing 267 is attached, boot 266 is slid over heat shrink tubing 267 and a portion of shroud 260. Boot 266 is preferably formed from a flexible material such as KRAYTON. Heat shrink tubing 267 and boot 266 generally inhibit kinking and provide bending strain relief to the cable near plug connector 250. Boot 266 has a longitudinal passageway (not visible) with a stepped profile therethrough. The first end of the boot passageway is sized to fit over the second end of shroud 260 and heat shrink tubing 267. The first end of the boot passageway has a stepped down portion sized for cable 110 and the heat shrink tubing 267 and acts as stop for indicating that the boot is fully seated. After boot 266 is seated, coupling nut 264 is slid up to shoulder 260c so that wire assembly 269 can be secured to boot 266. Specifically, a first end of wire assembly 269 is positioned about groove 266a on boot 266 and wire 269a is secured thereto using a first wire crimp (not numbered). Thus, coupling nut 264 is captured between shoulder 260c of shroud 260 and wire assembly 269 on boot 266. This advantageously keeps coupling nut 264 in place by preventing it from sliding past wire assembly 269 down onto cable 110.

A second end of wire assembly 269 is secured to protective cap 268 using a second wire crimp (not numbered). Consequently, protective cap 268 is prevented from being lost or separated from preconnectorized cable 200. In this embodiment, wire assembly 269 is attached to protective cap 268 at an eyelet 268a. Eyelet 268a is also useful for attaching a fish-tape so that preconnectorized assembly cable 200 can be pulled through a duct. Protective cap 268 has internal threads for engaging the external threads of coupling nut 264. Moreover, O-ring 259 provides a weatherproof seal between plug connector 250 and protective cap 268 when installed. When secured together, protective cap 268 and coupling nut 264 may rotate with respect to the remainder of preconnectorized cable 200, thus inhibiting torsional forces during pulling.

Many modifications and other embodiments of the present invention, within the scope of the appended claims, will become apparent to a skilled artisan. For example, cables according to the present invention may have high fiber counts using optical waveguides can be formed in ribbons that are stacked in suitable configurations such as a stepped profile. Cables according to the present invention can also include more than one cable stranded, thereby forming a breakout cable. Therefore, it is to be understood that the invention is not limited to the specific embodiments disclosed herein and that modifications and other embodiments may be made within the scope of the appended claims. Although specific terms are employed herein, they are used in a generic and descriptive sense only and not for purposes of limitation. The invention has been described with reference to silica-based optical waveguides, but the inventive concepts of the present invention are applicable to other suitable optical waveguides and/or cable configurations.

That which is claimed:

1. A protective casing for routing optical fibers, comprising:
    at least one tube, the at least one tube having at least one flexible roving at least partially embedded therein, the at least one flexible roving includes a resin matrix, the resin matrix being a water-based acrylic composition that includes an ethylene-acrylic acid, the resin matrix having a percent by weight of about 10 percent or less of the flexible roving, and the at least one flexible roving includes a water-swellable substance, wherein the at least one flexible roving is at least partially bonded with the at least one tube and the protective casing having an average shrinkage of about 1.0% or less during an average shrinkage test, wherein the average shrinkage test comprises taking a 1 meter sample of the protective casing and exposing the 1 meter sample to a 110° C. environment in a thermal chamber for at least two hours and then allowing the 1 meter sample to cool to about 20 C., thereafter the average shrinkage of the 1 meter sample is measured.

2. The protective casing of claim 1, the at least one tube being an outer tube and the protective casing further comprising an inner tube and a plurality of strength yarns generally disposed about the inner tube, wherein the outer tube surrounds the inner tube and the plurality of strength yarns.

3. The protective casing of claim 2, the plurality of strength yarns having a water-swellable coating.

4. The protective casing of claim 1, further comprising a plurality of flexible rovings, the plurality of flexible rovings being at least partially bonded with the at least one tube.

5. The protective casing of claim 1, the protective casing having at least two flexible rovings, the two flexible rovings being generally disposed about 180 degrees apart.

6. The protective casing of claim 1, the at least one tube being formed from a UV resistant material.

7. The protective casing of claim 1, the resin matrix having a percentage by weight of about 7 percent or less.

8. The protective casing of claim 1, wherein an average coefficient of thermal expansion (CTE) of the protective casing is about $5.0 \times 10^{-3}$%/° C. or less.

9. A protective casing for routing optical fibers, comprising:
an inner tube;
a plurality of strength yarns generally disposed about the inner tube;
an outer tube, the outer tube having at least one flexible roving at least partially embedded therein, the at least one flexible roving is at least partially bonded with the outer tube and the outer tube surrounds the inner tube and the plurality of strength yarns, wherein the protective casing has an average shrinkage of about 0.5% or less during an average shrinkage test, wherein the average shrinkage test comprises taking a 1 meter sample of the protective casing and exposing the 1 meter sample to a 110° C. environment in a thermal chamber for at least two hours and then allowing the 1 meter sample to cool to about 20° C., thereafter the average shrinkage of the 1 meter sample is measured.

10. The protective casing of claim 9, the at least one flexible roving having a resin matrix, the resin matrix of the at least one flexible roving having a percentage by weight of about 10 percent or less of the at least one flexible roving, the resin matrix being a water-based acrylic composition that includes an ethylene-acrylic acid.

11. The protective casing of claim 9, the at least one flexible roving including a water-swellable substance.

12. The protective casing of claim 9, further comprising a plurality of flexible rovings, the plurality of flexible rovings being at least partially bonded with the outer tube.

13. The protective casing of claim 9, the protective casing having two flexible rovings, the two flexible rovings being disposed about 180 degrees apart.

14. The protective casing of claim 9, the plurality of strength yarns having a water-swellable coating.

15. The protective casing of claim 9, the outer tube being formed from a UV resistant material.

16. The protective casing of claim 9, the at least one flexible roving including a resin matrix, the resin matrix having a percentage by weight of about 7 percent or less of the at least one flexible roving.

17. The protective casing of claim 9, wherein an average coefficient of thermal expansion (CTE) of the protective casing is about $5.0 \times 10^{-3}$%/° C. or less.

18. A protective casing for routing optical fibers, comprising:
an inner tube;
a plurality of strength yarns generally disposed about the inner tube;
an outer tube, the outer tube having at least one flexible roving at least partially embedded therein, the at least one flexible roving is at least partially bonded with the outer tube and the outer tube surrounds the inner tube and the plurality of strength yarns, wherein the protective casing having an average shrinkage of about 0.5% or less during an average shrinkage test, wherein an average coefficient of thermal expansion (CTE) of the outer tube is about $5.0 \times 10^{-3}$%/° C. or less.

19. The protective casing of claim 18, the at least one flexible roving having a resin matrix, the resin matrix of the at least one flexible roving having a percentage by weight of about 10 percent or less of the at least one flexible roving, the resin matrix being a water-based acrylic composition that includes an ethylene-acrylic acid.

20. The protective casing of claim 18, the protective casing having two flexible rovings, the two flexible rovings being disposed about 180 degrees apart.

21. The protective casing of claim 18, the plurality of strength yarns having a water-swellable coating.

22. The protective casing of claim 18, the at least one flexible roving including a water-swellable substance.

23. The protective casing of claim 18, the outer tube being formed from a UV resistant material.

24. The protective casing of claim 18, wherein an average coefficient of thermal expansion (CTE) of the protective casing is about $5.0 \times 10^{-3}$%/° C. or less.

* * * * *